US009209874B2

(12) United States Patent
Onodera et al.

(10) Patent No.: US 9,209,874 B2
(45) Date of Patent: Dec. 8, 2015

(54) WIRELESS TRANSMISSION APPARATUS, WIRELESS RECEPTION APPARATUS, WIRELESS COMMUNICATION SYSTEM, CONTROL PROGRAM AND INTEGRATED CIRCUIT

(75) Inventors: Takashi Onodera, Osaka (JP); Hiromichi Tomeba, Osaka (JP); Shimpei To, Osaka (JP); Hiroshi Nakano, Osaka (JP); Alvaro Ruiz Delgado, Osaka (JP); Minoru Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 13/882,556

(22) PCT Filed: Oct. 24, 2011

(86) PCT No.: PCT/JP2011/074404
§ 371 (c)(1),
(2), (4) Date: May 30, 2013

(87) PCT Pub. No.: WO2012/060237
PCT Pub. Date: May 10, 2012

(65) Prior Publication Data
US 2014/0146904 A1 May 29, 2014

(30) Foreign Application Priority Data
Nov. 1, 2010 (JP) .................................. 2010-245623

(51) Int. Cl.
*H04B 7/02* (2006.01)
*H04B 7/04* (2006.01)
(Continued)

(52) U.S. Cl.
CPC ............ *H04B 7/0456* (2013.01); *H04B 7/0417* (2013.01); *H04B 7/0632* (2013.01); *H04B 7/0689* (2013.01); *H04B 7/0697* (2013.01); *H04L 25/03942* (2013.01)

(58) Field of Classification Search
CPC .. H04B 7/0417; H04B 7/0632; H04B 7/0456; H04B 7/0697; H04B 7/0689; H04B 7/0669; H04L 25/03942; H04L 1/0618; H04L 1/06; H04L 25/0204
USPC ........................................................ 375/267
See application file for complete search history.

(56) References Cited

U.S. PATENT DOCUMENTS 8,385,246 B2    2/2013  Sawahashi et al.
2009/0046788 A1* 2/2009  Kotecha ........................ 375/260
(Continued)

FOREIGN PATENT DOCUMENTS

JP    2005-094255 A    4/2005
WO   2008/023646 A1   2/2008
WO   2010/105400 A1   9/2010

OTHER PUBLICATIONS

Official Communication issued in International Patent Application No. PCT/JP2011/074404, mailed on Nov. 29, 2011.
(Continued)

*Primary Examiner* — Zewdu Kassa
(74) *Attorney, Agent, or Firm* — Keating & Bennett, LLP

(57) ABSTRACT

The present invention switches an interference suppression system between a linear precoding and a nonlinear precoding in accordance with a communication environment. A wireless transmission apparatus is provided with a plurality of transmission antenna units (303), and multiplexes spatially and transmits a plurality of series of data with respect to at least one wireless reception apparatus, and includes a selection unit (307) configured to select any one precoding system from a plurality of types of precoding systems and a precoding unit (315) configured to carry out precoding with respect to the plurality of series of data using the selected precoding system. In addition, the selection unit selects either of a first precoding system carrying out linear processing with respect to the plurality of series of data or a second precoding system carrying out nonlinear processing with respect to the plurality of series of data.

4 Claims, 12 Drawing Sheets

(51) Int. Cl.
*H04B 7/06* (2006.01)
*H04L 25/03* (2006.01)

(56) References Cited

U.S. PATENT DOCUMENTS

| | | | |
|---|---|---|---|
| 2010/0046445 A1 | 2/2010 | Sawahashi et al. | |
| 2010/0232528 A1 | 9/2010 | Li et al. | |
| 2010/0266056 A1* | 10/2010 | Lee et al. | 375/260 |
| 2012/0014473 A1* | 1/2012 | Heath et al. | 375/295 |

OTHER PUBLICATIONS

Spencer et al., "An Introduction to the Multi-User MIMO Downlink", Adaptive Antennas and MIMO Systems for Wireless Communications, IEEE Communication Magazine, vol. 42, Issue 10, Oct. 2004, pp. 60-67.

Nokia Siemens Networks, Nokia, "Precoding for 4 Tx UE in LTE-Advanced UL", 3GPP TSG RAN WG1 Meeting #57, May 4-9, 2009.

Harashima et al., "Matched-Transmission Technique for Channels With Intersymbol Interference", IEEE Transaction on Communications, vol. COM-20, No. 4, Aug. 1972, pp. 774-780.

Liu et al., "Improved Tomlinson-Harashima Precoding for the Downlink of Multiple Antenna Multi-User Systems", Proc. IEEE Wireless and Communications and Networking Conference, Mar. 2005, pp. 466-472.

Joham et al., "MMSE Approaches to Multiuser Spatio-Temporal Tomlinson-Harashima Precoding", Proc. 5th Int. ITG Conf. on Source and Channel Coding, Jan. 2004, pp. 387-394.

Takeda et al., "Single-Carrier HARQ Using Joint THP and FDE", Proc. 2007 IEEE 66th Vehicular Technology Conference (VTC-2007 Fall), Sep. 2007, pp. 1118-1192.

Silva et al., "Analysis of Linear and Non-Linear Precoding Techniques for the Spatial Separation of Unicast and Multicast Users", Personal, Indoor and Mobile Radio Communications, PIMRG 2007, IEEE 18th International Symposium, Sep. 7, 2007, pp. 1-5.

Nokia Siemens Networks, Nokia, "Precoding for 4 Tx UE in LTE-Advanced UL", 3GPP TSG RAN WG1 Meeting #57, May 4-8, 2009.

* cited by examiner

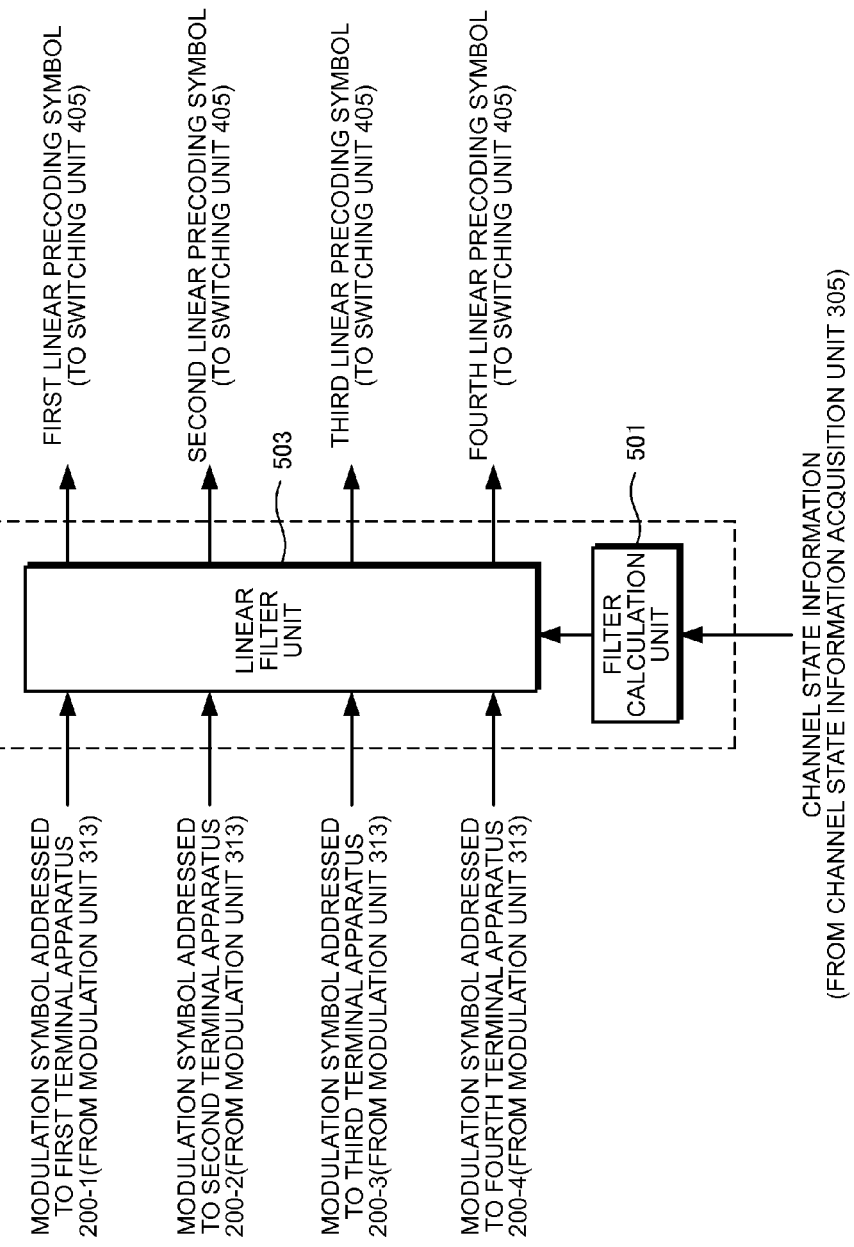

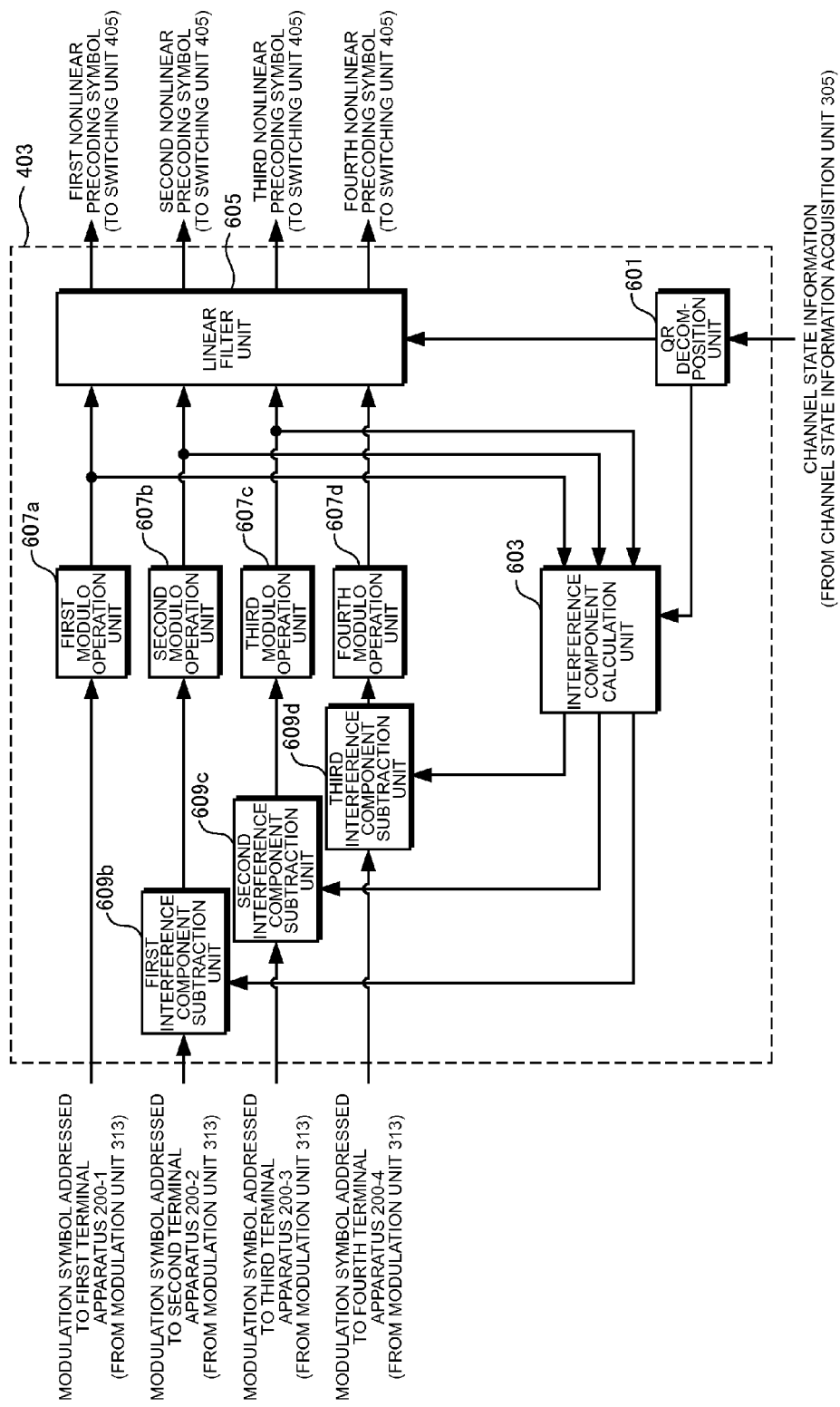

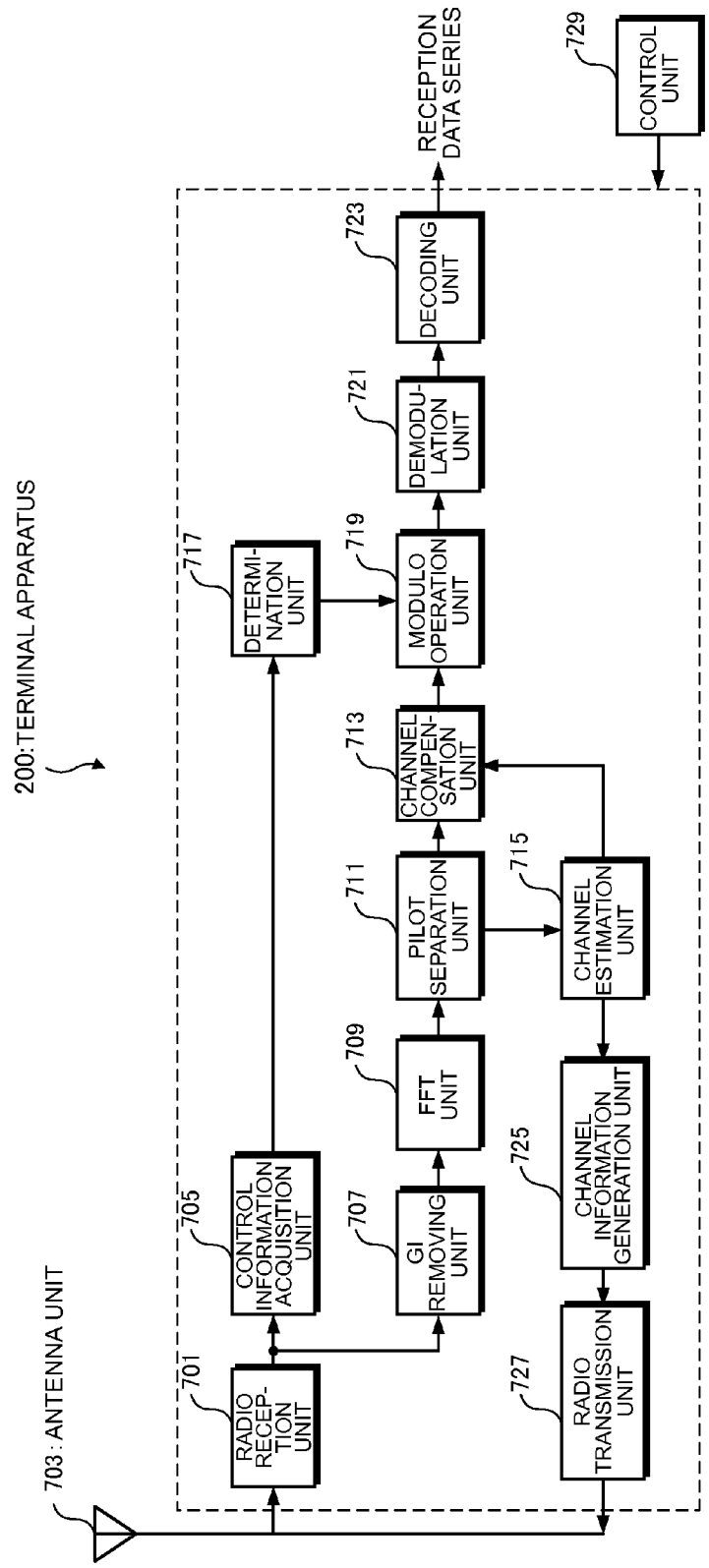

FIG.8

| MCS NUMBER | MODULATION SCHEME | CODING RATE | NEEDED SNIR [dB] |
|---|---|---|---|
| 0 | QPSK | 1/3 | 0.0 |
| 1 | QPSK | 1/2 | 2.5 |
| 2 | QPSK | 2/3 | 5.0 |
| 3 | 16QAM | 1/2 | 8.0 |
| 4 | 16QAM | 2/3 | 10.5 |
| 5 | 16QAM | 3/4 | 12.0 |
| 6 | 64QAM | 2/3 | 15.5 |
| 7 | 64QAM | 3/4 | 18.0 |

Rows 0–2: FIRST GROUP
Rows 3–7: SECOND GROUP

WIRELESS TRANSMISSION APPARATUS, WIRELESS RECEPTION APPARATUS, WIRELESS COMMUNICATION SYSTEM, CONTROL PROGRAM AND INTEGRATED CIRCUIT

TECHNICAL FIELD

The present invention relates to a wireless transmission apparatus, a wireless reception apparatus, a wireless communication system, a control program and an integrated circuit which suppress an interference in advance by signal processing and carry out transmitting/receiving.

BACKGROUND ART

A MIMO (Multiple-Input Multiple-Output: multi-inputs and multi-outputs) transmission technology where a plurality of antennas are used for transmitting/receiving, and a plurality of different data series (data streams) are multiplexed spatially in the same frequency band, and concurrent communication is carried out has been put into practical use in a wireless LAN and a cellular system or the like. In a single user MIMO (Single User MIMO) where a plurality of different data series are spatially multiplexed and transmitted to certain one terminal apparatus, in order to enhance performances in separation and detection of the plurality of series of data series in the terminal apparatus, there is a method where transmission is carried out after precoding is applied to a transmission signal in a base station apparatus.

In addition, in a next generation cellular system or the like, proposed is a system where the number of transmission antennas with which a base station apparatus (transmission apparatus) are provided will be increased significantly as compared with the number of reception antennas with which a terminal apparatus (reception apparatus) are provided. In a system like this, in order to utilize effectively the transmission antennas of the base station apparatus and enhance further a system throughput, a multiuser MIMO (Multi-User MIMO) where data series addressed to a plurality of terminal apparatuses (users) are MIMO-multiplexed is proposed. However, since among a plurality of terminal apparatuses which receive the signals multiplexed by the multiuser MIMO, signals received by other terminals are not able to be known, performances will have deteriorated significantly in the present state due to multi-user interferences (Multi-User Interference: MUI) occurred among streams addressed to each user.

Here, when the base station apparatus knows CSI (Channel State Information) which is a channel status information from each transmission antenna of the base station apparatus to each reception antenna of each terminal apparatus, a transmission signal which is able to suppress MUI at the time of reception in the terminal apparatus without giving a large load to the terminal apparatus is able to be generated, and several methods for the purpose of that have been proposed (Non-Patent Literature 1). For example, in order that the reception may be carried out in a state where MUI is suppressed at the time of reception in the terminal apparatus, there is a method where transmission is carried out after a precoding is applied to the transmission signal in the base station apparatus.

As the example, there are Zero-forcing (ZF) precoding which from a channel matrix H which has, as an element, a complex channel gain calculated from the CSI between each transmission antenna and each reception antenna of each terminal apparatus, carries out weighting on a transmission signal (the transmission signal is multiplied by $W=H^{-1}$) using an inverse matrix $H^{-1}$ thereof (or pseudo-inverse matrix $H^{\dagger}=H^H(HH^H)^{-1}$: a superscript H denotes a Hermite conjugate) as a weighting matrix (linear filter) W, and a linear precoding (beam forming) which carries out precoding of the transmission signal by linear processing, such as an MMSE precoding which carries out the weighting of the transmission signal base on the weighting matrix (linear filter) $W=H^H(HH^H+\alpha I)^{-1}$ (I denotes an identity matrix and $\alpha$ denotes a normalization coefficient) calculated by a minimum mean squared error (Minimum Mean Square Error: MMSE) norm.

In addition, as an example of another linear precoding, candidates (referred to as a code book) of a vector (constituent of weighting matrix) used for the linear precoding in the base station apparatuses are made to be determined in advance as known ones in transmitting/receiving, and a vector which will be able to be received in the most satisfactory performances in those candidates is made to be selected based on a channel estimation result in each terminal apparatus, and the information (Precoding Matrix Indicator: PMI) with respect to the selected vector is made to be fed back to the base station apparatus, and the base station apparatus multiplexes and transmits transmission data addressed to each terminal apparatus by the multiuser MIMO base on the linear precoding to a plurality of terminal apparatuses based on those fed back PMI (Non-Patent Literature 2).

As other examples, there is a nonlinear precoding which carries out precoding of the transmission signal based on nonlinear processing, where an interference signal component calculated from the CSI is made to be subtracted from the transmission signal in advance, and in order to suppress a transmit power which will have increased after the interference subtraction, the signal after the interference subtraction is made to be encoded at a signal point where the transmit power may be made to be reduced in a signal space. As one of this nonlinear precoding, Tomlinson-Harashima precoding (Tomlinson-Harashima Precoding: THP) which is capable of suppressing an increase in the transmit power based on applying a Modulo (Modulo, surplus) operation to signals in both of transmitting/receiving apparatuses has been proposed (Non-Patent Literature 3, Non-Patent Literature 4, Non-Patent Literature 5). At this time, also in the terminal apparatus which is a receiving side, the same Modulo operation as in the transmission with respect to the reception signal is made to be applied. Besides, the nonlinear process here mainly means one where processing in which a break point exists in outputs of the Modulo operation or the like is used.

In addition, based on the THP Modulo operation, in consideration of the fact that signal point arrangement at the time of a modulation in the base station apparatus is received by the terminal apparatus in a form repeated by a Modulo width, a method to calculate a logarithmic likelihood ratio (Log Likelihood Ratio: LLR) of demodulated bits (demodulation processing based on soft decision) from a Euclidean distance between a reception signal point (with noises added thereto) and each candidate signal point repeated by the Modulo width has been proposed (Non-Patent Literature 6).

CONVENTIONAL ART LITERATURE

Non-Patent Literature

Non-Patent Literature 1: "An Introduction to the Multi-User MIMO Downlink" Spencer, et al., IEEE Communication Magazine, Vol. 42, Issue 10, p. 60 to 67, October, 2004

Non-Patent Literature 2: 3GPP TSG RAN WG1 R1-091774, May, 2009

Non-Patent Literature 3: "Matched-Transmission Technique for Channels With Intersymbol Interference" Harashima, et al., IEEE Transaction on Communications, Vol. COM-20, No. 4, p. 774-780, August, 1972

Non-Patent Literature 4: "Improved Tomlinson-Harashima Precoding for the Downlink of Multiple Antenna Multi-User Systems" J. Liu, et al., Proc. IEEE Wireless and Communications and Networking Conference, p. 466-472, March, 2005

Non-Patent Literature 5: "MMSE Approaches to Multiuser Spatio-Temporal Tomlinson-Harashima Precoding" M. Joham, et al., Proc. 5th Int. ITG Conf. on Source and Channel Coding, p. 387-394, January, 2004

Non-Patent Literature 6: "Single-Carrier HARQ Using Joint THP and FDE" Kazuki Takeda, et al., Proc. 2007 IEEE 66th Vehicular Technology Conference (VTC-2007 Fall), p. 1188-1192, September, 2007

DISCLOSURE OF THE INVENTION

Summary of the Invention

Problems to be Solved by the Invention

Conventionally, in a communication system where MIMO transmission is performed, either the linear precoding or the nonlinear precoding which are described above is generally adopted as an interference suppression system. However, with respect to the linear precoding, there is a problem that a transmit power will have increased for suppressing interference (the reception quality will have deteriorated when a transmit power is controlled constant). In addition, there is a problem that when a correlation (spatial correlation) among each of channels between a plurality of transmission antennas of a base station apparatus and a reception antenna of a terminal apparatus becomes high, transmission performances will have deteriorated largely. On the other hand, with respect to the nonlinear precoding, there is a problem that in the case where a signal to noise power ratio (Signal to Noise power Ratio: SNR) or a signal to interference and noise power ratio (Signal to Interference plus Noise power Ratio: SINR) is low, a characteristics deterioration referred to as Modulo-Loss, where because ones which are received in a state where the reception signal point straddles a boundary line of a Modulo operation due to noises are Modulo-operated in the receiving side, the detection will have been carried out as the wrong signal point, will be generated.

As mentioned above, in the linear precoding and the non-linear precoding, advantages and demerits corresponding to communication environments each exists, and there is a problem in dealing with terminal apparatuses which are under various communication environments only by either of the interference suppression systems.

The present invention has been accomplished in view of above-mentioned problems, and the object is to provide a wireless transmission apparatus, a wireless reception apparatus, a wireless communication system, a control program and an integrated circuit which are capable of switching between the linear precoding and the nonlinear precoding in the interference suppression system in accordance with communication environments.

Means for Solving the Problems (1) In order to achieve above-mentioned objects, the present invention has taken the following measures. Namely, a wireless transmission apparatus of the present invention is a wireless transmission apparatus which includes a plurality of transmission antennas, and with respect to at least one wireless reception apparatuses multiplexes spatially and transmits a plurality of series of data, including: a selection unit configured to select any one precoding method from a plurality of types of precoding methods; and a precoding unit configured to carry out precoding with respect to the plurality of series of data using the selected precoding method.

In this way, since any one precoding method is selected from a plurality of types of precoding methods, and using the selected precoding method, precoding is carried out with respect to the plurality of series of data, it becomes possible to select appropriately a precoding method where transmission performances becomes satisfactory, in accordance with a communication environment and to perform MIMO transmission.

(2) In addition, in the wireless transmission apparatus of the present invention, the selection unit selects any one precoding method from a plurality of types of precoding methods based on channel state information acquired from the wireless reception apparatus or information derived from the channel state information.

In this way, since any one precoding method is selected from a plurality of types of precoding methods based on channel state information acquired from the wireless reception apparatus or information derived from the channel state information, it becomes possible to select appropriately a precoding method where transmission performances becomes satisfactory, in accordance with a communication environment, and to perform MIMO transmission.

(3) In addition, in the wireless transmission apparatus of the present invention, the selection unit selects either of a first precoding method carrying out linear processing with respect to the plurality of series of data or a second precoding method carrying out nonlinear processing with respect to the plurality of series of data.

In this way, since selected is either of a first precoding method carrying out linear processing with respect to the plurality of series of data or a second precoding method carrying out nonlinear processing with respect to the plurality of series of data, it becomes possible to perform a precoding such that an advantage of each precoding method appears. Consequently, it becomes possible to select appropriately a precoding method where transmission performance becomes satisfactory, in accordance with a communication environment, and to perform MIMO transmission.

(4) In addition, in the wireless transmission apparatus of the present invention, the selection unit, when all of the plurality of series of data are data addressed to a single wireless reception apparatus selects the first precoding method, and on the other hand, when the plurality of series of data are data addressed each to a plurality of wireless reception apparatuses, selects the second precoding method.

In this way, since when all of the plurality of series of data are data addressed to a single wireless reception apparatus selected is the first precoding method, and on the other hand, when the plurality of series of data are data addressed each to a plurality of wireless reception apparatuses, selected is the second precoding method, it becomes possible to select a precoding method in accordance with the system of MIMO transmission and perform MIMO transmission.

(5) In addition, the wireless transmission apparatus of the present invention further includes a control information generation unit which when all of the plurality of series of data are data addressed to a single wireless reception apparatus, generates a first information representing that all of the plurality of series of data are spatially multiplexed to be addressed to the single wireless reception apparatus, and on the other hand, when the plurality of series of data are data addressed each to a plurality of wireless reception apparatuses, generates a second information representing that the plurality of series of data are spatially multiplexed to be addressed each to a plurality of wireless reception apparatuses, wherein the first information is made to be transmitted to the single wireless reception apparatus, or the second information is made to be transmitted to the each wireless reception apparatus.

In this way, since the first information is made to be transmitted to the single wireless reception apparatus, or the second information is made to be transmitted to the each wireless reception apparatus, it becomes possible to determine whether to perform a Modulo operation in accordance with the system of selected MIMO transmission in the wireless reception apparatus.

(6) In addition, the wireless transmission apparatus of the present invention further includes a control information generation unit configured to generate control information representing the selected precoding method, wherein the control information is made to be transmitted to the wireless reception apparatus.

In this way, since the control information representing the selected precoding method is made to be transmitted to the wireless reception apparatus, it becomes possible to determine whether to perform a Modulo operation in accordance with the system of selected MIMO transmission in the wireless reception apparatus.

(7) In addition, in the wireless transmission apparatus of the present invention, the selection unit compares a reception quality value representing a reception quality corresponding to the channel state information with a predetermined threshold value, and as a result of the comparison, when the reception quality value is smaller than the threshold value, selects the first precoding method, and on the other hand, when the reception quality value is larger than the threshold value, selects the second precoding method.

In this way, since when the reception quality value is smaller than the threshold value, selected is the first precoding method, and on the other hand, when the reception quality value is larger than the threshold value, selected is the second precoding method, it becomes possible to select a precoding method where performances are satisfactory and perform multiuser MIMO transmission, in accordance with a reception quality.

(8) In addition, in the wireless transmission apparatus of the present invention, the selection unit, based on the channel state information, selects a modulation parameter for modulating data addressed to the wireless reception apparatus, and when the selected modulation parameter belongs to a first group where a needed reception quality is lower than a predetermined threshold value, selects the first precoding method, and on the other hand, when the selected modulation parameter belongs to a second group where a needed reception quality is higher than a predetermined threshold value, selects the second precoding method.

In this way, since when the selected modulation parameter belongs to a first group where a needed reception quality is lower than a predetermined threshold value, selected is the first precoding method, and on the other hand, when the selected modulation parameter belongs to a second group where a needed reception quality is higher than a predetermined threshold value, selected is the second precoding method, it becomes possible to select a precoding method where performances are satisfactory and perform multiuser MIMO transmission, in accordance with a reception quality. In addition, since a precoding method is able to be specified based on a modulation parameter in the wireless reception apparatus, it becomes needless to transmit information on a precoding method of the multiuser MIMO to the wireless reception apparatus.

(9) In addition, the wireless transmission apparatus of the present invention further includes a control information generation unit configured to generate control information representing the selected modulation parameter, wherein the control information is made to be transmitted to the wireless reception apparatus.

In this way, since control information representing the selected modulation parameter is made to be transmitted to the wireless reception apparatus, a precoding method is able to be specified based on the modulation parameter in the wireless reception apparatus. Consequently, it becomes needless to transmit information on a precoding method of the multiuser MIMO to the wireless reception apparatus.

(10) In addition, in the wireless transmission apparatus of the present invention, the selection unit, based on the channel state information, calculates a spatial correlation value of each channel to/from a plurality of wireless reception apparatuses, and compares the each spatial correlation value or a value derived from the each spatial correlation value with a predetermined threshold value, and as a result of the comparison, when the each spatial correlation value or a value derived from the each spatial correlation value is smaller than the threshold value, selects the first precoding method, and on the other hand, when the each spatial correlation value or a value derived from the each spatial correlation value is larger than the threshold value, selects the second precoding method.

In this way, since when the each spatial correlation value or a value derived from the each spatial correlation value is smaller than the threshold value, selected is the first precoding method, and on the other hand, when the each spatial correlation value or a value derived from the each spatial correlation value is larger than the threshold value, selected is the second precoding method, it becomes possible to perform multiuser MIMO transmission based on an appropriate precoding method in consideration of an influence of a spatial correlation.

(11) In addition, a wireless reception apparatus of the present invention is a wireless reception apparatus which receives from a wireless transmission apparatus a signal where a plurality of series of data is spatially multiplexed, including: a control information acquisition unit configured to acquire control information representing that all of the plurality of series of data are spatially multiplexed to be addressed to the single wireless reception apparatus, or control information representing that the plurality of series of data are spatially multiplexed to be addressed each to a plurality of wireless reception apparatuses; a determination unit which when the control information represents that all of the plurality of series of data are spatially multiplexed to be addressed to the self device, generates a first instruction signal instructing not to perform a Modulo operation, and on the other hand, when the control information represents that the plurality of series of data are spatially multiplexed to be addressed each to a plurality of wireless reception apparatuses, generates a second instruction signal instructing to perform a Modulo operation; and a Modulo operation unit configured to carry out a Modulo operation on a reception data symbol only when the second instruction signal is inputted.

Based on this configuration, it is able to be determined whether to perform a Modulo operation in accordance with whether a MIMO transmission system is the single user MIMO or the multiuser MIMO.

(12) In addition, a wireless reception apparatus of the present invention is a wireless reception apparatus which receives from a wireless transmission apparatus a signal where a plurality of series of data is spatially multiplexed, including: a control information acquisition unit configured to acquire control information representing a precoding method selected by the wireless transmission apparatus; a determination unit which when the control information represents a first precoding method carrying out linear processing, generates a first instruction signal instructing not to perform a Modulo operation, and on the other hand, when the control information represents a second precoding method carrying out nonlinear processing, generates a second instruction signal instructing to perform a Modulo operation; and a Modulo operation unit configured to carry out a Modulo operation on a reception data symbol only when the second instruction signal is inputted.

Based on this configuration, it is able to be determined whether to perform a Modulo operation in accordance with whether a precoding method is a first precoding method, or a second precoding method.

(13) In addition, a wireless reception apparatus of the present invention is a wireless reception apparatus which receives from a wireless transmission apparatus a signal where a plurality of series of data is spatially multiplexed, including: a control information acquisition unit configured to acquire a modulation parameter selected by the wireless transmission apparatus; a determination unit which when the modulation parameter belongs to a first group where a needed reception quality is lower than a predetermined threshold value, generates a first instruction signal instructing not to perform a Modulo operation, and on the other hand, when the selected modulation parameter belongs to a second group where a needed reception quality is higher than a predetermined threshold value, generates a second instruction signal instructing to perform a Modulo operation; and a Modulo operation unit configured to carry out a Modulo operation on a reception data symbol only when the second instruction signal is inputted.

Based on this configuration, it is able to be determined whether to perform a Modulo operation in accordance with whether a modulation parameter belongs to a first group or a second group.

(14) In addition, a wireless reception apparatus of the present invention is a wireless reception apparatus which receives from a wireless transmission apparatus a signal where a plurality of series of data is spatially multiplexed, including: a control information acquisition unit configured to acquire control information representing that all of the plurality of series of data are spatially multiplexed to be addressed to the single wireless reception apparatus, or control information representing that the plurality of series of data are spatially multiplexed to be addressed each to a plurality of wireless reception apparatuses; a determination unit which when the control information represents that all of the plurality of series of data are spatially multiplexed to be addressed to the self device, generates a first instruction signal instructing not to perform a Modulo operation, and on the other hand, when the control information represents that the plurality of series of data are spatially multiplexed to be addressed each to a plurality of wireless reception apparatuses, generates a second instruction signal instructing to perform a Modulo operation; and a demodulation unit which when the second instruction signal is inputted, performs demodulation in consideration of repetition of a signal point by a Modulo operation with respect to a reception data symbol.

Based on this configuration, it is able to be determined whether to perform demodulation in consideration of repetition of a signal point by a Modulo operation in accordance with whether an MIMO transmission system is the single user MIMO or the multiuser MIMO.

(15) In addition, a wireless reception apparatus of the present invention is a wireless reception apparatus which receives from a wireless transmission apparatus a signal where a plurality of series of data is spatially multiplexed, including: a control information acquisition unit configured to acquire control information representing a precoding method selected by the wireless transmission apparatus; a determination unit which when the control information represents a first precoding method carrying out linear processing, generates a first instruction signal instructing not to perform a Modulo operation, and on the other hand, when the control information represents a second precoding method carrying out nonlinear processing, generates a second instruction signal instructing to perform a Modulo operation; and a demodulation unit which when the second instruction signal is inputted, performs demodulation in consideration of repetition of a signal point by a Modulo operation with respect to a reception data symbol.

Based on this configuration, it is able to be determined whether to perform demodulation in consideration of repetition of a signal point by a Modulo operation in accordance with whether a precoding method is a first precoding method, or a second precoding method.

(16) In addition, a wireless reception apparatus of the present invention is a wireless reception apparatus which receives from a wireless transmission apparatus a signal where a plurality of series of data is spatially multiplexed, including: a control information acquisition unit configured to acquire a modulation parameter selected by the wireless transmission apparatus; a determination unit which when the modulation parameter belongs to a first group where a needed reception quality is lower than a predetermined threshold value, generates a first instruction signal instructing not to perform a Modulo operation, and on the other hand, when the selected modulation parameter belongs to a second group where a needed reception quality is higher than a predetermined threshold value, generates a second instruction signal instructing to perform a Modulo operation; and a demodulation unit which when the second instruction signal is inputted, performs demodulation in consideration of repetition of a signal point by a Modulo operation with respect to a reception data symbol.

Based on this configuration, it is able to be determined whether to perform demodulation in consideration of repetition of a signal point by a Modulo operation in accordance with whether a modulation parameter belongs to a first group or a second group.

(17) In addition, a wireless communication system of the present invention is a wireless communication system including a wireless transmission apparatus which includes a plurality of transmission antennas and multiplexes spatially and transmits a plurality of series of data with respect to at least one wireless reception apparatus, and a wireless reception apparatus which receives data from the wireless transmission apparatus, wherein the wireless transmission apparatus, when all of the plurality of series of data are a single user MIMO (Multiple Input Multiple Output) that is data addressed to a single wireless reception apparatus selects a first precoding method carrying out linear processing, and on the other hand, when the plurality of series of data are a multiuser MIMO that are data each addressed to a plurality of wireless reception apparatuses, selects a second precoding method carrying out nonlinear processing, and carries out the selected precoding on the plurality of series of data and transmits the plurality of series of data to the single wireless reception apparatus or the plurality of wireless reception apparatuses, and at the same time, transmits MIMO system information representing whether the MIMO is a single user MIMO or a multiuser MIMO to the single wireless reception apparatus or the plurality of wireless reception apparatuses, and the wireless reception apparatus, acquires the MIMO system information, and when the MIMO system information represents the single user MIMO, does not perform a Modulo operation on a reception data symbol, and on the other hand, when the MIMO system information represents the multiuser MIMO, performs a Modulo operation on a reception data symbol.

Based on this configuration, it becomes possible to select appropriately a precoding method where transmission performances becomes satisfactory, in accordance with a communication environment, and to perform MIMO transmission. In addition, in the wireless reception apparatus, it is able to be determined whether to perform a Modulo operation in accordance with whether a MIMO transmission system is the single user MIMO or the multiuser MIMO.

(18) In addition, a wireless communication system of the present invention is a wireless communication system including a wireless transmission apparatus which includes a plurality of transmission antennas and multiplexes spatially and transmits a plurality of series of data with respect to at least one wireless reception apparatus, and a wireless reception apparatus which receives data from the wireless transmission apparatus, wherein the wireless transmission apparatus selects either of a first precoding method carrying out linear processing with respect to the plurality of series of data or a second precoding method carrying out nonlinear processing with respect to the plurality of series of data, and carries out the selected precoding on the plurality of series of data and transmits the plurality of series of data to the wireless reception apparatus, and at the same time, transmits control information representing the selected precoding method to the wireless reception apparatus, and the wireless reception apparatus, acquires the control information, and when the control information represents a first precoding method carrying out linear processing, does not perform a Modulo operation on a reception data symbol, and on the other hand, when the control information represents a second precoding method carrying out nonlinear processing, performs a Modulo operation on a reception data symbol.

Based on this configuration, it becomes possible to select appropriately a precoding method where transmission performance becomes satisfactory, in accordance with a communication environment, and to perform MIMO transmission. In addition, in the wireless reception apparatus, it is able to be determined whether to perform a Modulo operation in accordance with whether a precoding method is a first precoding method or a second precoding method.

(19) In addition, a control program of the present invention is a control program of a wireless transmission apparatus which includes a plurality of transmission antennas, and multiplexes spatially and transmits a plurality of series of data to at least one wireless reception apparatus, the control program making into commands in a computer readable and executable way a series of processes: a process configured to acquire channel state information from the wireless reception apparatus; a process which based on the channel state information or information derived from the channel state information, selects either of a first precoding method carrying out linear processing with respect to the plurality of series of data or a second precoding method carrying out nonlinear processing with respect to the plurality of series of data; and a process configured to carry out precoding with respect to the plurality of series of data using the selected precoding method.

In this way, since selected is either of a first precoding method carrying out linear processing with respect to the plurality of series of data or a second precoding method carrying out nonlinear processing with respect to the plurality of series of data, it becomes possible to perform a precoding such that an advantage of each precoding method appears. Consequently, it becomes possible to select appropriately a precoding method where transmission performances become satisfactory, in accordance with a communication environment, and to perform MIMO transmission.

(20) In addition, an integrated circuit of the present invention is an integrated circuit which makes the wireless transmission apparatus exert a plurality of functions by being implemented in a wireless transmission apparatus provided with a plurality of transmission antennas, the functions including the series of: a function which multiplexes spatially and transmits a plurality of series of data to at least one wireless reception apparatus; a function which acquires channel state information from the wireless reception apparatus; a function which selects either of a first precoding method carrying out linear processing with respect to the plurality of series of data or a second precoding method carrying out nonlinear processing with respect to the plurality of series of data, based on the channel state information or information derived from the channel state information; and a function which carries out precoding with respect to the plurality of series of data using the selected precoding method.

In this way, since selected is either of a first precoding method carrying out linear processing with respect to the plurality of series of data or a second precoding method carrying out nonlinear processing with respect to the plurality of series of data, it becomes possible to perform a precoding such that an advantage of each precoding method appears. Consequently, it becomes possible to select appropriately a precoding method where transmission performances become satisfactory, in accordance with a communication environment, and to perform MIMO transmission.

Effect of the Invention

According to the present invention, it becomes possible to select appropriately, from a linear precoding and a nonlinear precoding, a precoding method where transmission performances become satisfactory, in accordance with a communication environment, and to perform MIMO transmission.

BRIEF DESCRIPTION OF THE DRAWINGS

FIG. 4 is a functional block diagram illustrating one configuration example of a linear precoding unit 401 according to the first embodiment of the present invention;

FIG. 5 is a functional block diagram illustrating one configuration example of a nonlinear precoding unit 403 according to the first embodiment of the present invention;

FIG. 6A is a functional block diagram illustrating one configuration example of a terminal apparatus 200 according to the first embodiment of the present invention;

FIG. 8 is a table illustrating an example of an MCS according to a second embodiment of the present invention;

BEST MODES FOR CARRYING OUT THE INVENTION

Hereinafter, communication technologies according to embodiments of the present invention will be described with reference to drawings.

First Embodiment

With respect to a communication technology according to the present embodiment, described will be a sample communication system where a base station apparatus (wireless transmission apparatuses) performs multiuser MIMO transmission by selecting four terminal apparatuses from a first terminal apparatus to a fourth terminal apparatus from among a plurality of terminal apparatuses (wireless reception apparatus), and where after multi-user interferences (MUI) arising among streams addressed to each terminal apparatus is made to be suppressed in advance based on a linear precoding or a nonlinear precoding, transmitting thereof is carried out.

Figure 1:
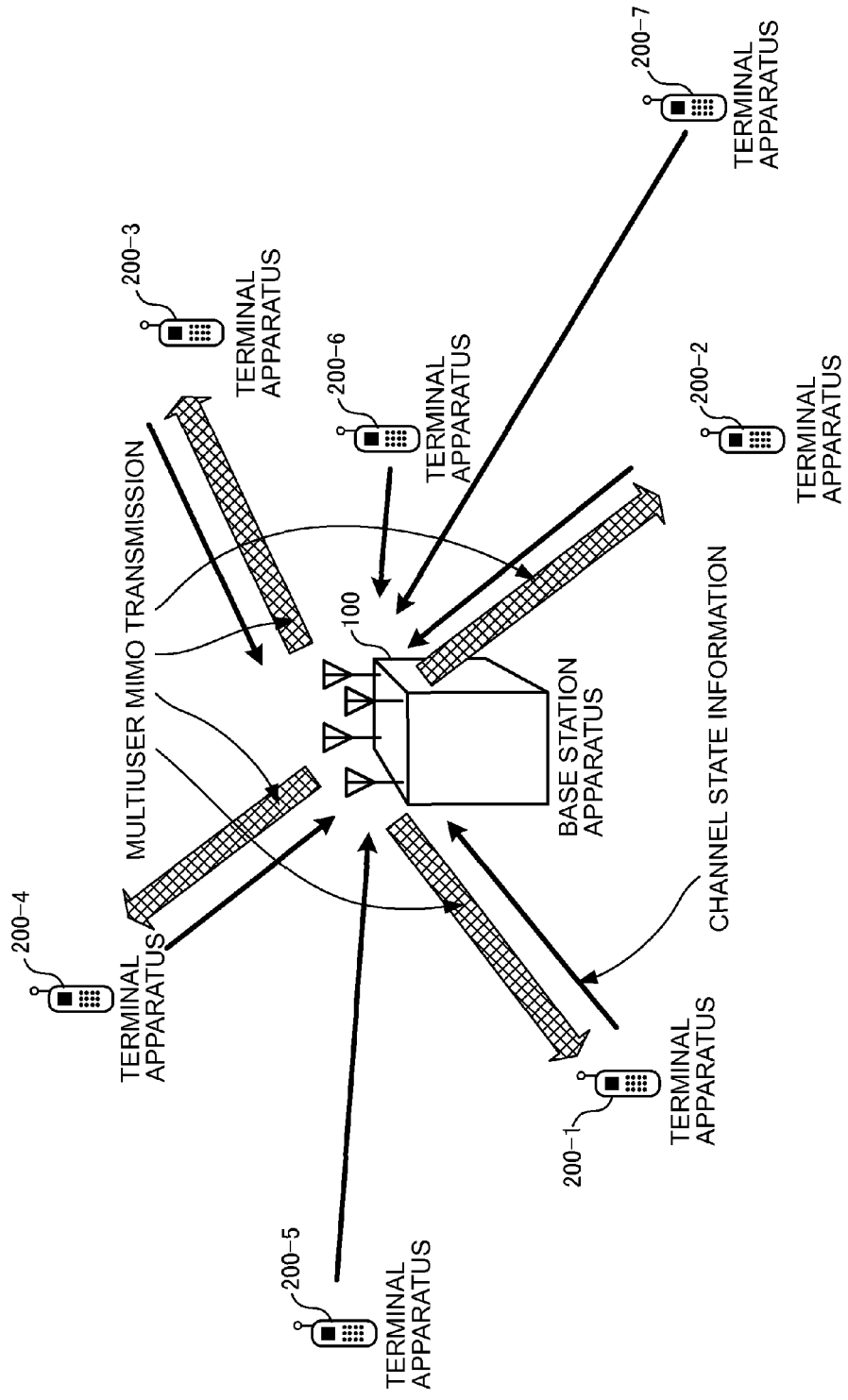
FIG. 1 illustrates an example of a schematic configuration of a communication system according to a first embodiment of the present invention.

FIG. 1 illustrates an example of a schematic configuration of a communication system according to a first embodiment of the present invention. As illustrated in FIG. 1, the communication system in the present embodiment is the communication system where a base station apparatus 100 communicates with a plurality of terminal apparatuses 200 (for example, the first to seventh terminal apparatuses 200-1 to 200-7), and the base station apparatus 100 selects, from among these terminal apparatuses 200, a plurality of terminal apparatuses 200 (for example, the first to fourth terminal apparatuses 200-1 to 200-4), and in transmission of downlinks thereof, performs the multiuser MIMO transmission where transmission data addressed to the plurality of terminal apparatuses 200 are multiplexed spatially in the same frequency band and a concurrent communication thereof is carried out. In addition, a communication system using an orthogonal frequency division multiplexing (Orthogonal Frequency Division Multiplexing: OFDM) as a transmission scheme will be described as an example, and however, the communication system is not limited to this.

Each terminal apparatus 200-1 to 200-7 receives a pilot signal (reference signal) transmitted by the base station apparatus 100, and estimates a channel state between each transmission antenna of the base station apparatus 100 and each reception antenna of the terminal apparatus 200 of its own, and each reports channel information representing the channel state to the base station apparatus 100. The base station apparatus 100 selects a plurality of terminal apparatuses 200 (in FIG. 1, four terminal apparatuses 200-1 to 200-4) based on the channel information which are reported from each terminal apparatus 200 and others, and performs the multiuser MIMO transmission where transmission data addressed to the plurality of terminal apparatuses 200 are multiplexed spatially and the concurrent communication thereof is carried out.

For example, as channel information, the base station apparatus 100 receives, from each terminal apparatus 200, reception quality information (Channel Quality Indicator: CQI) which represents a signal power to noise power ratio (Signal to Noise power Ratio: SNR), a signal power to interference and noise power ratio (Signal to Interference plus Noise power Ratio: SINR), a carrier power to noise power ratio (Carrier to Noise power Ratio: CNR), a carrier power to interference and noise power ratio (Carrier to Interference plus Noise power Ratio: CINR) or a value calculated from them, and channel status information (Channel State Information: CSI) which represents a complex channel gain and a covariance value thereof or the like from each transmission antenna of the base station apparatus 100 to each reception antenna of each terminal apparatus 200, or PMI which represents information on a precoding vector selected by each terminal apparatus 200 based on the channel, and selects terminal apparatuses 200 to be multiplexed by the multiuser MIMO on the basis of these pieces of information. In the present embodiment, the communication system where an SINR is reported as CQI is made to be an example, and a case where four terminal apparatuses 200 in which the SINR is comparable are selected will be described as an example.

Figure 2:
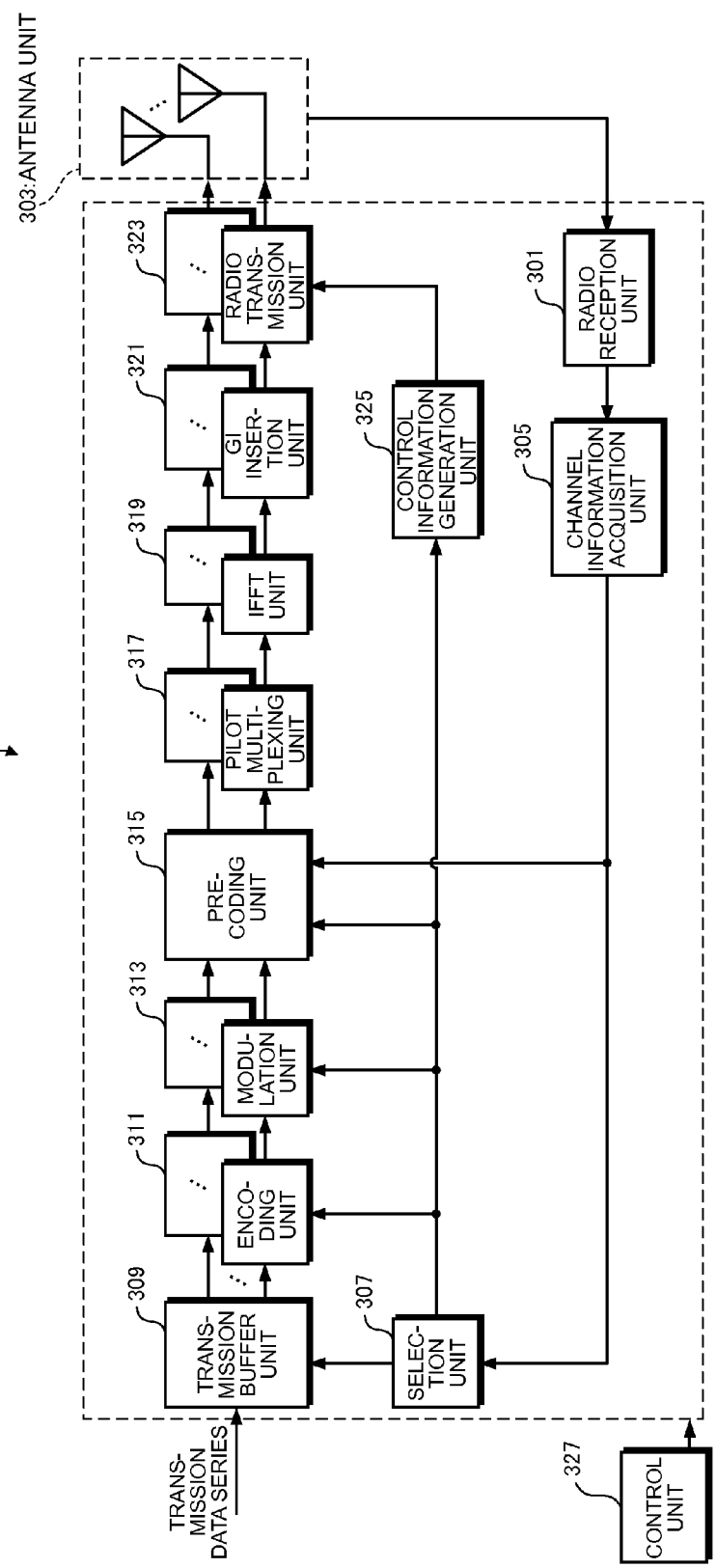
FIG. 2 is a functional block diagram illustrating one configuration example of a base station apparatus 100 according to the first embodiment of the present invention.

FIG. 2 is a functional block diagram illustrating one configuration example of the base station apparatus 100 according to the first embodiment of the present invention. A radio reception unit 301 receives signals transmitted from each terminal apparatus 200 (the first terminal apparatus 200-1 to the seventh terminal apparatus 200-7) via a plurality of antennas of an antenna unit 303.

A channel information acquisition unit 305 acquires, from the received signal, channel information where information on the CQI, and CSI or PMI, transmitted by each terminal apparatus 200-1 to 200-7 are included. The selection unit 307, based on channel information of each terminal apparatus 200 acquired in the channel information acquisition unit 305, selects a plurality of terminal apparatuses 200 to be multiplexed by the multiuser MIMO. Besides, in the present embodiment, four terminals that are the first to fourth terminal apparatuses 200-1 to 200-4 where an SINR is comparable are assumed to be selected. Besides, by that a plurality of terminal apparatuses 200 where the SINR is comparable are made to be selected and multiuser-MIMO-multiplexed, impartiality and efficiency of a transmit power distribution is able to be made high.

Next, the selection unit 307 compares an average value $\gamma_{ave}$ or a minimum value $\gamma_{min}$ of SINRs reported from the four selected terminal apparatuses 200 with a threshold value $\gamma_{th}$ determined in advance, and outputs a precoding method selection signal where the linear precoding is selected as the precoding method of the multiuser MIMO when the average value $\gamma_{ave}$ or the minimum value $\gamma_{min}$ is smaller than the threshold value $\gamma_{th}$, and the nonlinear precoding is selected when the average value $\gamma_{ave}$ or the minimum value $\gamma_{min}$ is larger than the threshold value $\gamma_{th}$. In addition, based on channel information of each selected terminal apparatus 200, modulation parameters such as a modulation scheme and coding rate (Modulation and Coding Scheme: MCS) of transmission data addressed to each terminal apparatus 200 may be selected. Besides, as mentioned above, there are an SNR and an SINR or the like as channel information, and however, in the present specification, a concept including an average value, a minimum value (lowest value) and a maximum value (highest value), of these pieces of channel information is made to be defined as "reception quality value representing a reception quality corresponding to channel information".

A transmission buffer unit 309 accumulates transmission data series inputted from a higher layer addressed to each terminal apparatus 200, and outputs each transmission data series addressed to the first to fourth terminal apparatuses 200-1 to 200-4 which are selected in the selection unit 307 to an encoding unit 311. The encoding unit 311 error-correction-encodes the transmission data series inputted from the transmission buffer unit 309 addressed to the first to fourth terminal apparatuses 200-1 to 200-4. Besides, when a coding rate of transmission data addressed to each terminal apparatus 200 is selected in the selection unit 307, rate matching (puncture) is made to be performed in accordance with the coding rate. When a coding rate is not specified, the rate matching may be performed with a predetermined coding rate. A modulation unit 313 modulates each error-correction-encoded transmission data series addressed to the first to fourth terminal apparatuses 200-1 to 200-4, and outputs modulation symbols for every subcarrier addressed to the first to fourth terminal apparatuses 200-1 to 200-4. Besides, when a modulation scheme of the transmission data addressed to each terminal apparatus 200 is selected in the selection unit 307, the modulation unit 313 performs modulation using the modulation scheme.

When a modulation scheme is not specified, it is preferred to perform modulation with a predetermined modulation scheme.

A precoding unit 315 has each modulation symbol addressed to the first to fourth terminal apparatuses 200-1 to 200-4 inputted, and applies a precoding to each inputted modulation symbol based on a precoding method selected by the selection unit 307 based on CSI or PMI from each terminal apparatus 200, which is acquired by the channel information acquisition unit 305, and generates multiuser MIMO symbols for each of a plurality of antennas of the antenna unit 303 which are used for transmission. Besides, details of the precoding unit 315 will be described later.

A pilot multiplexing unit 317 multiplexes a pilot signal to be transmitted from each antenna of the antenna unit 303 with multiuser MIMO symbols to be transmitted from each antenna. Besides, multiplexing of the pilot signal is preferred to be carried out so that the pilot signal transmitted from each antenna of the base station apparatus 100 may be received in a form where each pilot signal is able to be identified in each terminal apparatus 200-1 to 200-4, and for example, time division multiplexing may be carried out, and frequency division multiplexing such as subcarrier dividing may be carried out, and code division multiplexing may be carried out.

An IFFT unit 319 applies each frequency time conversion such as a fast inverse Fourier transform (Inverse Fast Fourier Transform: IFFT) to a multiuser MIMO signal for every antenna where the pilot signal is multiplexed, and carries out conversion thereof into a time domain signal. A GI insertion unit 321 inserts a guard interval (Guard Interval: GI) each into the time domain signal for every antenna. A radio transmission unit 323 transmits the signal with GI inserted via each antenna of the antenna unit 303. A control information generation unit 325, based on a selection result of the selection unit 307, generates control information including allocation information of terminal apparatuses 200 multiplexed by the multiuser MIMO, information on a precoding method of the multiuser MIMO, and information on an MCS with respect to each terminal apparatus 200 or the like, and transmits the control information to each terminal apparatus 200 via the radio transmission 323 and the antenna unit 303.

A control unit 327 controls each unit mentioned above and makes the each unit carry out the processing.

Figure 3:
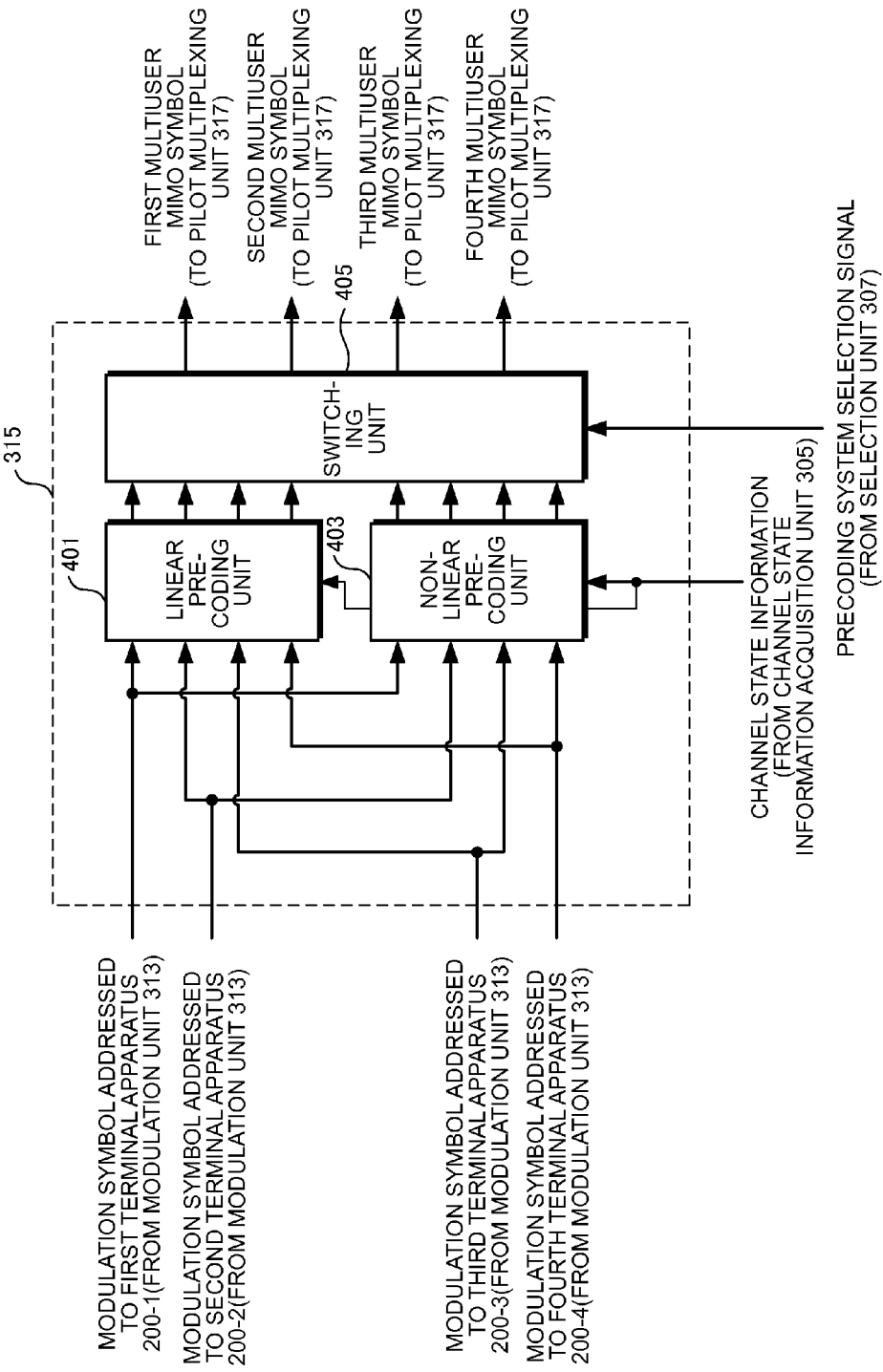
FIG. 3 is a functional block diagram illustrating one configuration example of a precoding unit 315 according to the first embodiment of the present invention.

FIG. 3 is a functional block diagram illustrating one configuration example of the precoding unit 315 according to the first embodiment of the present invention. The precoding unit 315 has a linear precoding unit 401, a nonlinear precoding unit 403 and a switching unit 405. The linear precoding unit 401 has each modulation symbol addressed to the first to fourth terminal apparatuses 200-1 to 200-4 inputted, and based on the CSI or PMI of the channel information acquired by the channel information acquisition unit 305, applies the linear precoding to each inputted modulation symbol. Besides, details of the linear precoding unit 401 will be described later. The nonlinear precoding unit 403 has each modulation symbol addressed to the first to fourth terminal apparatuses 200-1 to 200-4 inputted, and based on the CSI or PMI of the channel information acquired by the channel information acquisition unit 305, applies the nonlinear precoding to each inputted modulation symbol.

Besides, details of the nonlinear precoding unit 403 will be described later.

The switching unit 405 has a linear precoding result outputted by the linear precoding unit 401 and a nonlinear precoding result outputted by the nonlinear precoding unit 403 inputted, and selects either of them based on the precoding method selection signal inputted from the selection unit 307, and outputs the first to fourth multiuser MIMO symbols to be transmitted each from each antenna of the antenna unit 303. Besides, the linear precoding unit 401 and nonlinear precoding unit 403, when the precoding method selection signal has not each selected its own precoding method, preferably does not perform the processing operation. Thereby, electric power consumption is able to be reduced.

FIG. 4 is a functional block diagram illustrating one configuration example of the linear precoding unit 401 according to the first embodiment of the present invention. The linear precoding unit 401 has a filter calculation unit 501 and a linear filter unit 503. In an example of FIG. 4, a case where the multiuser MIMO signal is generated by a Zero-Forcing precoding on the basis of a CSI as the linear precoding will be described. The filter calculation unit 501, from CSI among the channel information of each terminal apparatus 200 acquired by the channel information acquisition unit 305, generates, for every subcarrier, a channel matrix H which has a complex channel gain between each antenna of the base station apparatus 100 and the antenna of each terminal apparatus 200 in elements thereof, and calculates an inverse matrix thereof $H^{-1}$ (or a pseudo inverse matrix $H^{\dagger}=H^{H}(HH^{H})^{-1}$) as a weighting matrix W that is a linear filter. The linear filter unit 503 has modulation symbols addressed to the first to fourth terminal apparatuses 200-1 to 200-4 as an input, and multiplies them by the linear filter W calculated for every each subcarrier in the filter calculation unit 501, and outputs the multiuser MIMO symbols to be transmitted each from each antenna of the antenna unit 303.

Thereby, when each terminal apparatus 200 receives the above-mentioned multiuser MIMO symbols, interferences (MUI) by signals addressed to other than the terminal apparatus 200 of its own are canceled based on the linear precoding, and only the signal addressed to the terminal apparatus 200 of its own is received. Besides, in the above-mentioned linear precoding unit 401, although an example where an inverse matrix is calculated and used as a linear filter in the filter calculation unit 501 has been described, it is not limited to this, and the weighting matrix $W=H^H(HH^H+\alpha I)^{-1}$ (I represents an identity matrix and $\alpha$ represents a normalization coefficient) calculated by an MMSE norm may be used as the linear filter. In this case, although the MUI is not completely canceled at the time of reception, reception characteristics will be enhanced since the SINR is able to be maximized. In addition, in a communication system using PMI, a weighting matrix is made to be calculated from a precoding vector indicated by the PMI of each terminal apparatus 200 in the filter calculation unit 501 and is made to be used as the linear filter.

FIG. 5 is a functional block diagram illustrating one configuration example of the nonlinear precoding unit 403 according to the first embodiment of the present invention. In an example of FIG. 5, a case where the multiuser MIMO signal is generated by Tomlinson-Harashima Precoding (THP) as the nonlinear precoding will be described. A QR decomposition unit (interference matrix calculation unit) 601, from CSI among the channel information of each terminal apparatus 200 acquired by the channel information acquisition unit 305, generates, for every subcarrier, the channel matrix H which has a complex channel gain between each antenna of the base station apparatus 100 and the antenna of each terminal apparatus 200 in elements thereof, and applies QR decomposition to a Hermite conjugate $H^H$ of the channel matrix H, and decomposes it into a unitary matrix Q and an upper triangular matrix R, and furthermore, calculates Hermite conjugate $R^H$ (will be a lower triangular matrix) of the upper triangular matrix R, and calculates an interference matrix $B=(\text{diag}R^H)^{-1}R^H-I$ representing a gain of MUI among each terminal apparatus 200 to output it to an interference component calculation unit 603, and outputs the unitary matrix Q to a linear filter unit 605. Where, a diagX is a matrix having only diagonal components of a matrix X, and I represents an identity matrix. Here, the interference matrix B will have a form of Formula (1).

[Formula 1]

$$B = \begin{pmatrix} 0 & 0 & 0 & 0 \\ b_{21} & 0 & 0 & 0 \\ b_{31} & b_{32} & 0 & 0 \\ b_{41} & b_{42} & b_{43} & 0 \end{pmatrix} \quad (1)$$

A first Modulo operation unit 607a (a first Modulo operation unit 607a to fourth Modulo operation unit 607d are together represented as a Modulo operation unit 607) applies a Modulo operation to modulation symbols addressed to a first terminal apparatus 200-1 generated in the modulation unit 313. Besides, since MUI does not exist with respect to modulation symbols addressed to the first terminal apparatus 200-1, the interference component subtraction unit 609 has been omitted. Furthermore, the Modulo operation unit 607a is also omissible. The interference component calculation unit 603 calculates, based on the interference matrix B calculated in the QR decomposition unit 601, an interference component which a Modulo operation result of modulation symbols of each subcarrier addressed to the first terminal apparatus 200-1 gives to modulation symbols of each subcarrier addressed to a second terminal apparatus 200-2. Here, an element $b_{21}$ at the first column of the second row of the interference matrix B represents a complex gain of interferences which modulation symbols addressed to the first terminal apparatus 200-1 exert on modulation symbols addressed to the second terminal apparatus 200-2. By multiplying this element by the Modulo operation result of modulation symbols addressed to the first terminal apparatus 200-1, an interference component are able to be calculated.

A first interference component subtraction unit 609b subtracts, for every subcarrier, interference components given to modulation symbols addressed to a second terminal apparatus 200-2 calculated by the interference component calculation unit 603 from modulation symbols addressed to a second terminal apparatus 200-2 generated in the modulation unit 313. A second Modulo operation unit 607b applies a Modulo operation to modulation symbols addressed to the second terminal apparatus 200-2 where interference components have been subtracted, using a Modulo width predetermined based on a modulation scheme.

The interference component calculation unit 603 calculates interference components which the Modulo operation result of modulation symbols of each subcarrier addressed to the first terminal apparatus 200-1 and the Modulo operation result of modulation symbols of each subcarrier addressed to the second terminal apparatus 200-2 give to modulation symbols of each subcarrier addressed to the third terminal apparatus 200-3. Here, an element $b_{31}$ at the first column of the third row of the interference matrix B represents a complex gain of interferences which modulation symbols addressed to the first terminal apparatus 200-1 exert on modulation symbols addressed to the third terminal apparatus 200-3, and an element $b_{32}$ at the second column of the third row of the interference matrix B represents a complex gain of interferences which modulation symbols addressed to the second terminal apparatus 200-2 exert on modulation symbols addressed to the third terminal apparatus 200-3, and by multiplying these elements each by the Modulo operation result of modulation symbols addressed to the first terminal apparatus 200-1 and the Modulo operation result of modulation symbols addressed to the second terminal apparatus 200-2, interference components are able to be calculated.

A second interference component subtraction unit 609c subtracts, for every subcarrier, interference components given to modulation symbols addressed to a third terminal apparatus 200-3 calculated by the interference component calculation unit 603 from modulation symbols addressed to the third terminal apparatus 200-3 generated in the modulation unit 313. A third Modulo operation unit 607c applies a Modulo operation to modulation symbols addressed to the third terminal apparatus 200-3 where interference components have been subtracted, using a Modulo width predetermined based on a modulation scheme.

The interference component calculation unit 603 calculates interference components which the Modulo operation result of modulation symbols of each subcarrier addressed to the first terminal apparatus 200-1, the Modulo operation result of modulation symbols of each subcarrier addressed to the second terminal apparatus 200-2 and the Modulo operation result of modulation symbols of each subcarrier addressed to the third terminal apparatus 200-3 give to modulation symbols of each subcarrier addressed to the fourth terminal apparatus 200-4. Here, an element $b_{41}$ at the first column of the fourth row of the interference matrix B represents a complex gain of interferences which modulation symbols addressed to the first terminal apparatus 200-1 exert on modulation symbols addressed to the fourth terminal apparatus 200-4, and an element $b_{42}$ at the second column of the fourth row of the interference matrix B represents a complex gain of interferences which modulation symbols addressed to the second terminal apparatus 200-2 exert on modulation symbols addressed to the fourth terminal apparatus 200-4, and an element $b_{43}$ at the third column of the fourth row of the interference matrix B represents a complex gain of interferences which modulation symbols addressed to the third terminal apparatus 200-3 exert on modulation symbols addressed to the fourth terminal apparatus 200-4, and by multiplying these elements each by from the Modulo operation result of modulation symbols addressed to the first terminal apparatus 200-1 to the Modulo operation result of modulation symbols addressed to the third terminal apparatus 200-3, interference components are able to be calculated.

A third interference component subtraction unit 609d subtracts, for every subcarrier, interference components given to modulation symbols addressed to a fourth terminal apparatus 200-4 calculated by the interference component calculation unit 603 from modulation symbols addressed to the fourth terminal apparatus 200-4 generated in the modulation unit 313. A fourth Modulo operation unit 607d applies a Modulo operation to modulation symbols addressed to the fourth terminal apparatus 200-4 where interference components have been subtracted, using a Modulo width predetermined based on a modulation scheme.

The linear filter unit 605 has as inputs the Modulo operation result of modulation symbols addressed to the first terminal apparatus 200-1 outputted by the first Modulo operation unit 607a, the Modulo operation result of modulation symbols addressed to the second terminal apparatus 200-2 outputted by the second Modulo operation unit 607b, the Modulo operation result of modulation symbols addressed to the third terminal apparatus 200-3 outputted by the third Modulo operation unit 607c and the Modulo operation result of modulation symbols addressed to the fourth terminal apparatus 200-4 outputted by the fourth Modulo operation unit 607d, and carries out multiplication for every subcarrier using the unitary matrix Q calculated in the QR decomposition unit 601 as the linear filter, and outputs multiuser MIMO symbols to be transmitted each from each antenna of the antenna unit 303.

Thereby, when each terminal apparatus 200 receives the above-mentioned multiuser MIMO symbols, interferences (MUI) by signals addressed to other than the terminal apparatus 200 of its own are canceled based on THP, and only the signal addressed to the terminal apparatus 200 of its own is received. Besides, in the present embodiment, although, as a method to realize THP, a method to use the QR decomposition of a channel matrix has been described as an example, it is not limited to this, and a method described in above-mentioned Non-Patent Literature 5 such that rearrangement of terminal apparatuses 200 in THP may be quasi-optimized using the method of V-BLAST (Vertical Bell Laboratories Layered Space Time) may be used.

FIG. 6A is a functional block diagram illustrating one configuration example of a terminal apparatus 200 according to the first embodiment of the present invention. A radio reception unit 701 receives a signal from the base station apparatus 100 via an antenna unit 703.

A control information acquisition unit 705 extracts and acquires, from a reception signal, control information including allocation information of terminal apparatuses 200 multiplexed by the multiuser MIMO, information on the precoding method of the multiuser MIMO and information on modulation parameters (MCS or the like) with respect to each terminal apparatus 200, which are from the base station apparatus 100. A GI removing unit 707 removes a guard interval (GI) from the received signal. A FFT unit 709 time-frequency-converts the reception signal with GI removed by a fast Fourier transform (Fast Fourier Transform: FFT) or the like, and converts it into modulation symbols for every sub-carrier. A pilot separation unit 711 separates modulation symbols into symbols of reception data and symbols of a pilot signal, and each inputs symbols of reception data to a channel compensation unit 713, and symbols of the pilot signal to a channel estimation unit 715. The channel estimation unit 715 estimates a channel state (complex channel gain) between each antenna of the base station apparatus 100 and the antenna unit 703 of the terminal apparatus 200, and a reception quality represented by an SNR or an SINR based on symbols of the separated pilot signal.

The channel compensation unit 713 performs channel compensation (equalization) with respect to reception data symbols based on an estimation result of a channel state in the channel estimation unit 715. A determination unit 717 determines whether information on the precoding method of the multiuser MIMO included in the control information acquired by the control information acquisition unit 705 is the information representing the multiuser MIMO based on the linear precoding or the information representing the multiuser MIMO based on the nonlinear precoding, and generates a signal which instructs the Modulo operation unit 719 not to perform Modulo operation in the case of the linear precoding, and instructs the Modulo operation unit 719 to perform Modulo operation in the case of the nonlinear precoding. The Modulo operation unit 719, when channel-compensated reception data symbols are inputted and the instruction signal to perform Modulo operation is inputted from the determination unit 717, applies Modulo operation to channel-compensated reception data symbols using a width of Modulo operation (Modulo width) predetermined in accordance with a modulation scheme, or when the instruction signal not to perform Modulo operation is inputted, outputs channel-compensated reception data symbols as they are.

A demodulation unit 721 applies demodulation to each reception data symbol outputted by the Modulo operation unit 719. Besides, when modulation parameters (MCS or the like) are included in the control information acquired by the control information acquisition unit 705 and a modulation scheme is specified, demodulation is performed in accordance with the modulation scheme. When a modulation scheme is not specified, it is preferred to perform demodulation in accordance with a predetermined modulation scheme. A decoding unit 723 performs an error correction decoding processing with respect to the demodulated series, and generates and outputs reception data series. Besides, when modulation parameters (MCS or the like) are included in the control information acquired by the control information acquisition unit 705 and a coding rate is specified, the error correction decoding processing is performed after rate matching (depuncture) is performed in accordance with the coding rate. When the coding rate is not specified, the rate matching may be performed with a predetermined coding rate.

A channel information generation unit 725, based on the estimated channel state, generates reception quality information (CQI) which represents an SNR, an SINR, a CNR, a CINR or a value calculated from them, CSI which represents a complex channel gain and its covariance value or the like from each transmission antenna of the base station apparatus 100 to each reception antenna of each terminal apparatus 200, or PMI which represents a vector selected from candidates of a predetermined precoding vector based on a channel state. A radio transmission unit 727, via an antenna unit 703, transmits the channel information generated by the channel information generation unit 725 to the base station apparatus 100. A control unit 729 controls each unit mentioned above, and makes each processing thereof carried out. Besides, in the above, although a case where an SINR is used as a criterion to select a precoding method has been described, it is not limited to this, and an SNR, a CNR, a CINR or the like may be selected as the criterion, for example.

In the above, an example has been described where the terminal apparatus 200 of the receiving side, when it is determined that the Modulo operation is performed in the determination unit 717 (the nonlinear precoding has been performed in the base station apparatus 100), performs the Modulo operation on reception data symbols channel-compensated in the Modulo operation unit 719 before the demodulation (determination of the reception signal point) in the demodulation unit 721.

Figure 6B:
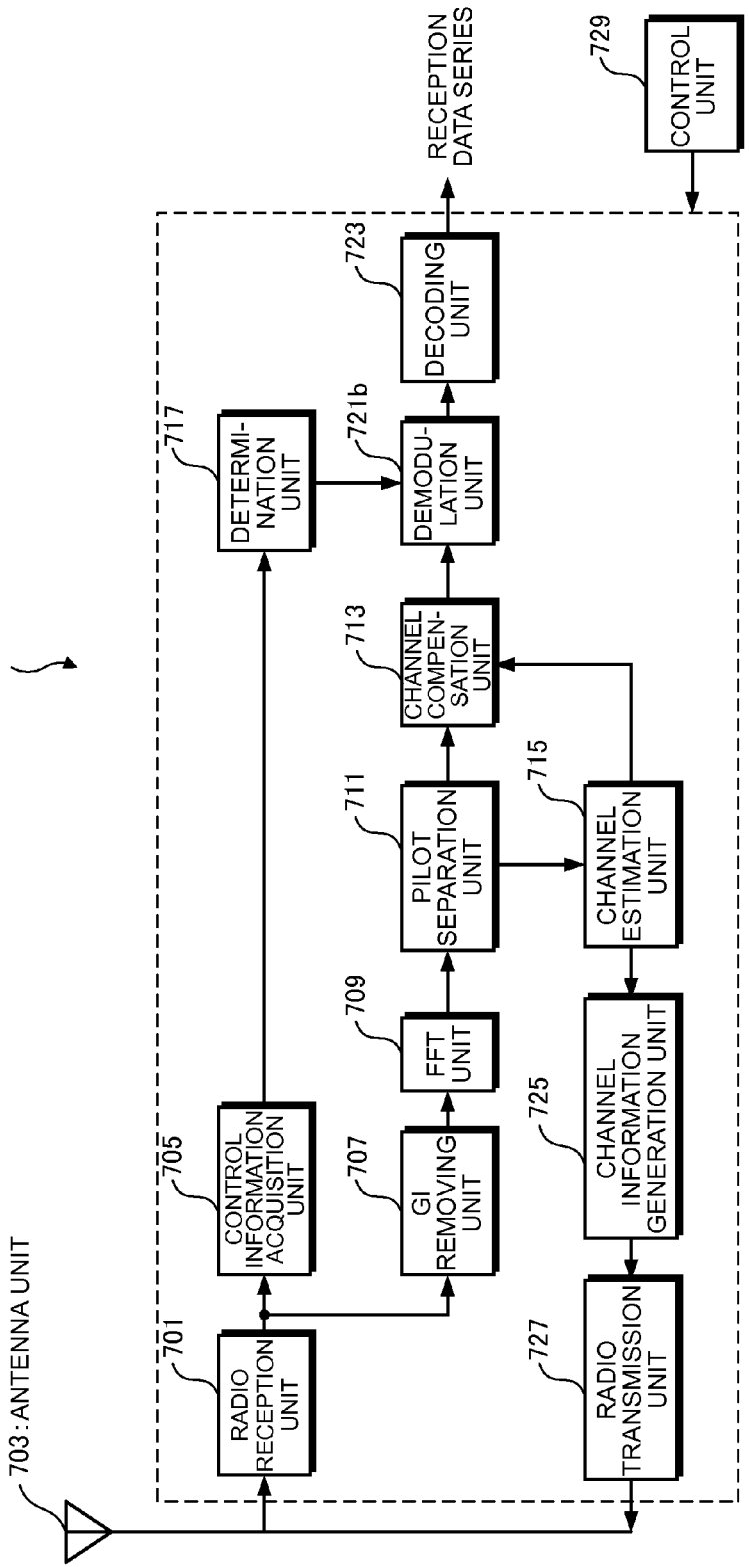
FIG. 6B is a functional block diagram illustrating other configuration example of the terminal apparatus 200 according to the first embodiment of the present invention.

FIG. 6B is a functional block diagram illustrating other configuration example of a terminal apparatus 200 according to the first embodiment of the present invention. In a terminal apparatus 200b of FIG. 6B, the Modulo operation unit 719 is not provided unlike the terminal apparatus 200 of FIG. 6A. A demodulation unit 721b, when an instruction signal to perform a Modulo operation is inputted from the determination unit 717, in consideration that a reception signal point arrangement without noise (candidate signal point arrangement) becomes a form where the signal point arrangement at the time of the modulation in the base station apparatus 100 has been repeated by a Modulo width, calculates a logarithmic likelihood ratio (Log Likelihood Ratio: LLR) of demodulated bits (demodulation processing based on a soft decision) from a Euclidean distance between a reception signal point (with noises added) and each candidate signal point repeated by the Modulo width.

The LLR is inputted into a decoding unit 723, and an error correction decoding is performed. Here, calculation of the LLR in the demodulation unit 721b is able to be carried out by a well-known method described in formulas (15) to (20) of Non-Patent Literature 6, for example.

That is, the calculation of the LLR is able to be carried out using an algorithm where the LLR is calculated using a Euclidean distance between the reception signal point and the candidate signal point which is close to the reception signal point among each candidate signal point repeated by the Modulo width. Besides, a configuration as illustrated in FIG. 6B will be applicable in the same way also in a terminal apparatus 200 of each subsequent embodiment.

Figure 7:
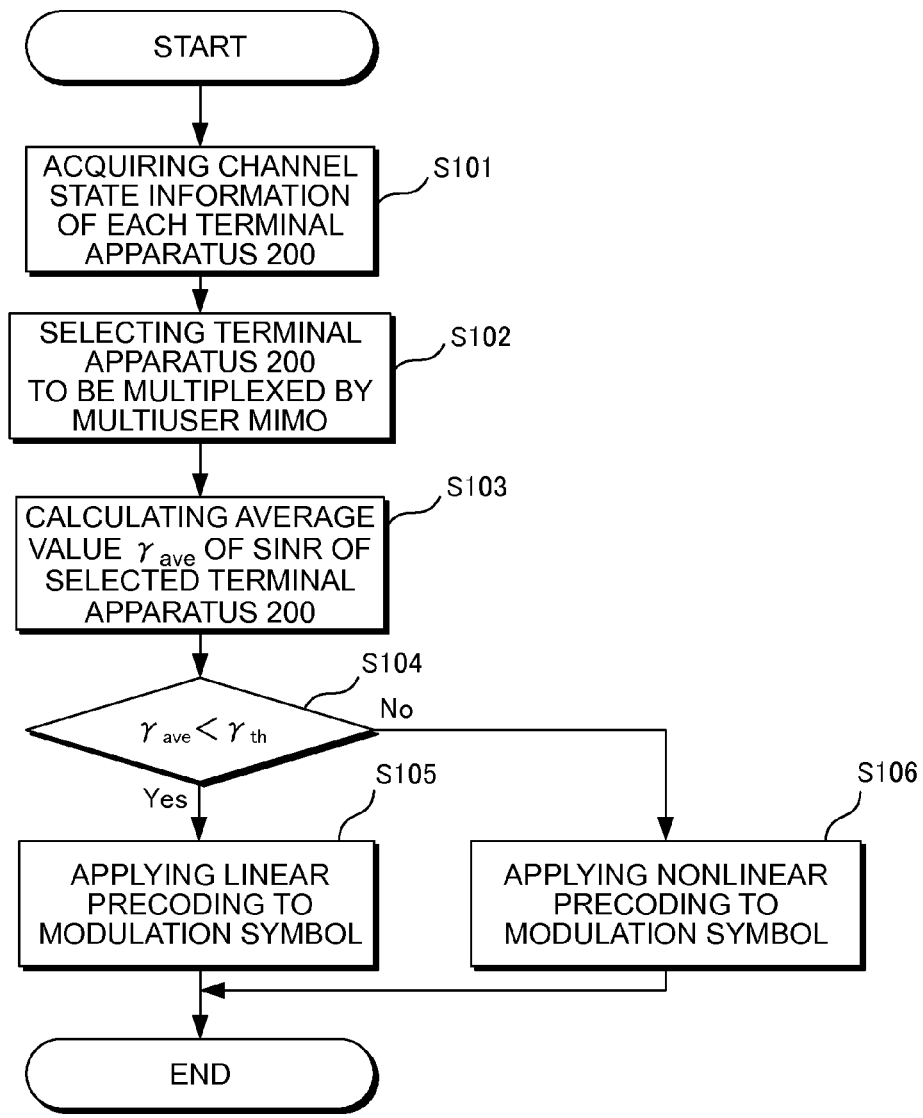
FIG. 7 is a flow chart illustrating an example of a selection process operation of a precoding method in a selection unit 307 and the precoding unit 315 according to the first embodiment of the present invention.

FIG. 7 is a flow chart illustrating an example of a selection process operation of a precoding method in the selection unit 307 and the precoding unit 315 according to the first embodiment of the present invention. In the selection unit 307, the channel information acquired in the channel information acquisition unit 305 is inputted (Step S101), and a plurality of terminal apparatuses 200 to be multiplexed by the multiuser MIMO are selected based on the inputted channel information (Step S102), and an SINR is acquired from channel information of a plurality of selected calculated (Step S103), and the average value $\gamma_{ave}$ of the calculated SINR is made to be compared with a predetermined threshold value $\gamma_{th}$ (Step S104), and in the precoding unit 315, if the average value $\gamma_{ave}$ is smaller than the threshold value $\gamma_{th}$ (Yes at Step S104), a result where a linear precoding has been applied to the inputted each modulation symbol is outputted (Step S105), and if the average value $\gamma_{ave}$ is no less than the threshold value $\gamma_{th}$ (No at Step S104), a result where a nonlinear precoding has been applied to the inputted each modulation symbol is outputted (Step S106).

As described above, according to the present embodiment, when an SINR of each terminal apparatus 200 spatially multiplexed by the multiuser MIMO is low, the nonlinear precoding where characteristics deterioration (Modulo-Loss) due to the Modulo operation arise is made to be avoided, and use of the linear precoding is made to be selected, and when an SINR is high, by selecting use of the nonlinear precoding having a good transmit power efficiency, the multiuser MIMO transmission based on a precoding method where performances are more satisfactory even in any kind of SINR will become possible.

Second Embodiment

Next, a communication technology according to a second embodiment of the present invention will be described. Also in the present embodiment in the same way as the first embodiment, in FIG. 1, a communication system will be described as an example, where a base station apparatus 100 communicates with a plurality of terminal apparatuses 200 (first to seventh terminal apparatuses 200-1 to 200-7), and selects, from among these terminal apparatuses 200, four of terminal apparatuses 200 that are first to fourth terminal apparatuses 200-1 to 200-4, and performs the multiuser MIMO transmission, and suppresses, in advance, MUI arising among streams addressed to each terminal apparatus based on a linear precoding or a nonlinear precoding, and carries out transmission thereof. Each terminal apparatus 200-1 to 200-7 receives a pilot signal (reference signal) transmitted by the base station apparatus 100, and estimates a channel state between each transmission antenna of the base station apparatus 100 and each reception antenna of the terminal apparatus 200 of its own, and reports channel information representing the channel state each to the base station apparatus 100. The base station apparatus 100 selects a plurality of terminal apparatuses 200 (in FIG. 1, four terminal apparatuses 200-1 to 200-4) based on the channel information which are reported from each terminal apparatus 200 and others, and performs the multiuser MIMO transmission where transmission data addressed to the plurality of terminal apparatuses 200 are multiplexed spatially and concurrent communication thereof is carried out.

For example, as the channel information, the base station apparatus 100 receives, from each terminal apparatus 200, reception quality information CQI which represents an SNR, an SINR, a CNR, a CINR or a value calculated from them, and channel status information CSI which represents a complex channel gain and a covariance value thereof or the like from each transmission antenna of the base station apparatus 100 to each reception antenna of each terminal apparatus 200, or PMI which represents information on a precoding vector selected by each terminal apparatus 200 based on the channel, and selects terminal apparatuses 200 to be multiplexed by the multiuser MIMO on the basis of these pieces of information. In the present embodiment, the communication system where an SINR is reported as the CQI is made to be an example, and a case where four terminal apparatuses 200 in which the SINR is comparable are selected will be described as an example. Although a configuration of the base station apparatus 100 in the present embodiment is the same as that of FIG. 2, operations in the selection unit 307 and the control information generation unit 325 differ from those of the first embodiment. Hereinafter, a part where operations differ from those of the first embodiment will be described, and with respect to a part where the same operations are performed, description will be omitted.

The selection unit 307, based on the channel information of each terminal apparatus 200 acquired in the channel information acquisition unit 305, selects a plurality of terminal apparatuses 200 to be multiplexed by the multiuser MIMO. Besides, in the present embodiment, description will be carried out assuming that four terminals that are first to fourth terminal apparatuses 200-1 to 200-4 where an SINR is comparable has been selected. Next, modulation parameters (MCS or the like) of transmission data addressed to each terminal apparatus 200 are selected based on an SINR reported from each selected terminal apparatus 200. Hereinafter, a case where an MCS is used as the modulation parameter will be described as an example.

Furthermore, the selection unit 307 outputs a precoding method selection signal where a linear precoding is selected as a precoding method of the multiuser MIMO when the selected MCS belongs to a first group where a needed SINR is low, and a nonlinear precoding is selected when the selected MCS belongs to a second group where a needed SINR is high. The control information generation unit 325, based on a selection result of the selection unit 307, generates control information including allocation information of terminal apparatuses 200 multiplexed by the multiuser MIMO and information on an MCS with respect to each terminal apparatus 200, and transmits them to each terminal apparatus 200 via the radio transmission unit 323 and the antenna unit 303. Besides, in the present embodiment, it is not necessary to notify terminal apparatuses 200 of information on the precoding method of the multiuser MIMO.

Although a configuration of the terminal apparatus 200 in the present embodiment is the same as that of FIG. 6A or 6B, operations of the control information acquisition unit 705 and the determination unit 717 differ from those of the first embodiment. Hereinafter, with respect to the case of FIG. 6A, a part where operations differ from those of the first embodiment will be described, and with respect to a part where the same operations are performed and the case of FIG. 6B, description will be omitted. The control information acquisition unit 705 extracts and acquires, from a reception signal, control information including allocation information of terminal apparatuses 200 multiplexed by the multiuser MIMO, and information on an MCS with respect to each terminal apparatus 200, which are from the base station apparatus 100. The determination unit 717, when information on the MCS included in the control information acquired by the control information acquisition unit 705 belongs to a first group where a needed SINR is low, instructs the Modulo operation unit 719 so as not to perform a Modulo operation assuming that a linear precoding has been used, and when the information belongs to a second group where a needed SINR is high, instructs the Modulo operation unit 719 so as to perform a Modulo operation assuming that a nonlinear precoding has been used.

Besides, in the above, although a case where an SINR is used as a criterion to select an MCS has been described, it is not limited to this, and an SNR, a CNR, or a CINR or the like may be selected as a criterion, for example. In addition, in the above, although a case where an MCS is used as a modulation parameter has been described, it is not limited to this, and a modulation scheme, a coding rate, a transport block size (Transport Block Size), a spreading ratio, or a combination thereof may be used as a modulation parameter, for example.

FIG. 8 is a table illustrating an example of an MCS according to the second embodiment of the present invention. Using a table of FIG. 8, an SINR of each terminal apparatus 200 is compared with a needed SINR (SINR needed for achieving transmission qualities such as a targeted error rate and a transmission rate) that is a threshold value of each MCS, and the MCS of transmission data addressed to each terminal apparatus 200 is made to be selected. Besides, since terminal apparatuses 200 where an SINR is comparable has been selected, it is preferred to select the same MCS based on the minimum value of the SINR of each of those selected terminal apparatuses 200. Alternatively, an MCS is made to be classified into two groups of a first group where a needed SINR is lower than a predetermined threshold value and a second group where a needed SINR is high, and an MCS with respect to selected each terminal apparatus 200 may be selected so as to belong to the same group. For example, in FIG. 8, an MCS having an MCS number no more than No. 2 is made to be in a first group, and an MCS having an MCS number no less than No. 3 is made to be in a second group.

Figure 9:
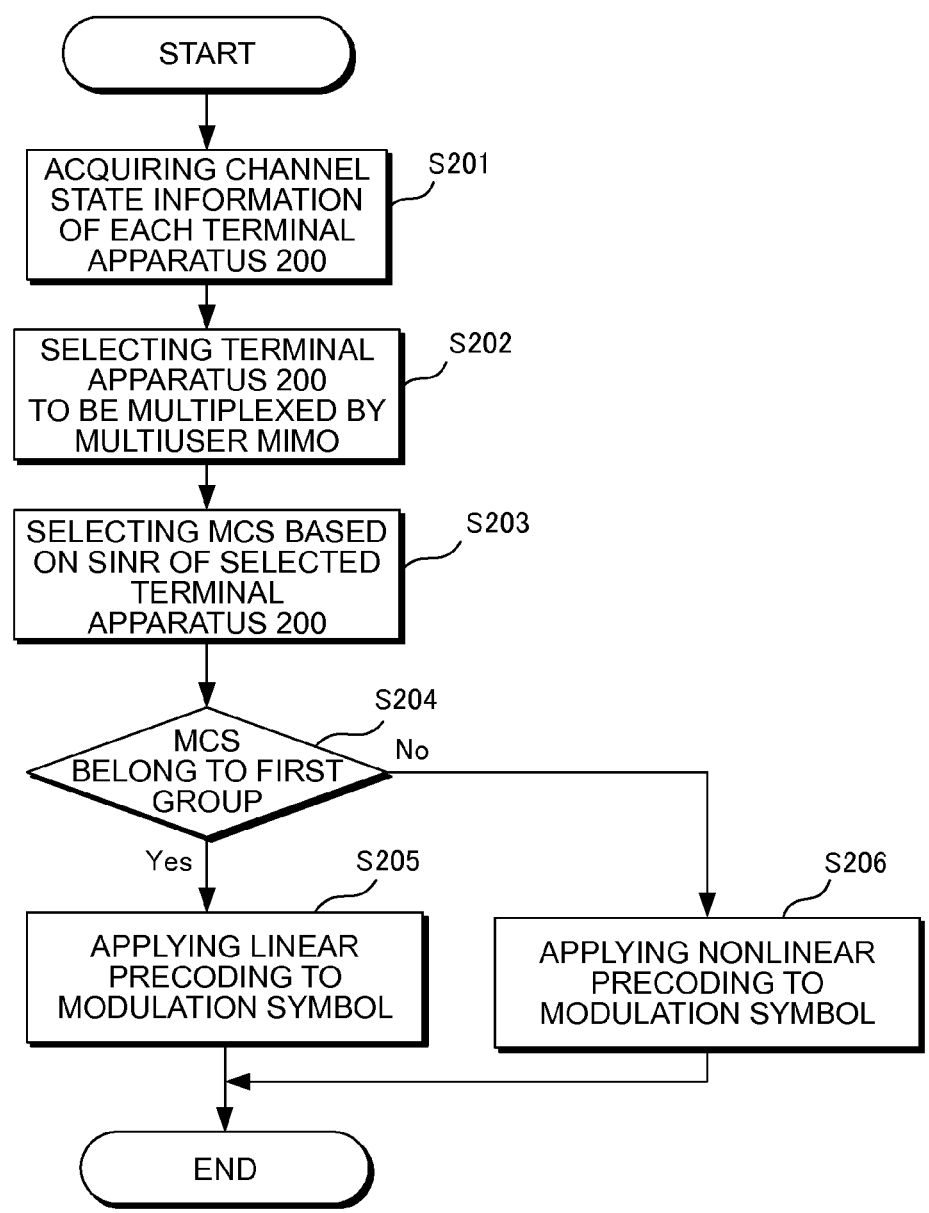
FIG. 9 is a flow chart illustrating an example of a selection process operation of a precoding method in the selection unit 307 and precoding unit 315 according to the second embodiment of the present invention.

FIG. 9 is a flow chart illustrating an example of selection process operations of a precoding method in the selection unit 307 and precoding unit 315 according to the second embodiment of the present invention. In the selection unit 307, the channel information acquired in the channel information acquisition unit 305 is inputted (Step S201), and a plurality of terminal apparatuses 200 to be multiplexed by the multiuser MIMO are selected based on the inputted channel information (Step S202), and an SINR is acquired from channel information of a plurality of selected terminal apparatuses 200, and based on the SINR, an MCS with respect to each terminal apparatus 200 is selected (from the same group) (Step S203), and it is examined whether the selected MCS belongs to a first group (Step S204), and in the precoding unit 315, if the MCS belongs to a first group (Yes at Step S204), a result where a linear precoding is applied to each inputted modulation symbol is made to be outputted (Step S205), and if the MCS does not belong to a first group (it belongs to a second group) (No at Step S204), a result where a nonlinear precoding is applied to each inputted modulation symbol is made to be outputted (Step S206).

As described above, according to the present embodiment, when an SINR of each terminal apparatus 200 spatially multiplexed by the multiuser MIMO is low, the nonlinear precoding where characteristics deterioration (Modulo-Loss) due to the Modulo operation arise is made to be avoided, and use of the linear precoding is made to be selected, and when an SINR is high, by selecting use of the nonlinear precoding having a good transmit power efficiency, the multiuser MIMO transmission by a precoding method where performances are more satisfactory even in any kind of SINR will become possible. Furthermore, the terminal apparatus 200 will be able to determine the precoding method used, based on information on an MCS from the base station apparatus 100, and information on the precoding method of the multiuser MIMO needs not to be notified from the base station apparatus 100 to the terminal apparatus 200.

Third Embodiment

Next, a communication technology according to a third embodiment of the present invention will be described. Also in the present embodiment in the same way as the first embodiment, in FIG. 1, a communication system will be described as an example, where the base station apparatus 100 communicates with a plurality of terminal apparatuses 200 (first to seventh terminal apparatuses 200-1 to 200-7), and selects, from among these terminal apparatuses 200, four of terminal apparatuses 200 that are first to fourth terminal apparatuses 200-1 to 200-4, and performs the multiuser MIMO transmission, and suppresses, in advance, MUI arising among streams addressed to each terminal apparatus based on a linear precoding or a nonlinear precoding to carry out transmission thereof. Each terminal apparatus 200-1 to 200-7 receives a pilot signal (reference signal) transmitted by the base station apparatus 100, and estimates a channel state between each transmission antenna of the base station apparatus 100 and each reception antenna of the terminal apparatus 200 of its own, and reports channel information representing the channel state each to the base station apparatus 100. The base station apparatus 100 selects a plurality of terminal apparatuses 200 (in FIG. 1, four terminal apparatuses 200-1 to 200-4) based on the channel information which are reported from each terminal apparatus 200 and others, and performs the multiuser MIMO transmission where transmission data addressed to the plurality of terminal apparatuses 200 are multiplexed spatially and the concurrent communication thereof is carried out.

For example, as channel information, the base station apparatus 100 receives, from each terminal apparatus 200, reception quality information CQI which represents an SNR, an SINR, a CNR, a CINR or a value calculated from them, and channel status information CSI which represents a complex channel gain and a covariance value thereof or the like from each transmission antenna of the base station apparatus 100 to each reception antenna of each terminal apparatus 200, and selects terminal apparatuses 200 to be multiplexed by the multiuser MIMO on the basis of these pieces of information. In the present embodiment, a communication system where an SINR is reported as CQI is made to be an example, and a case where four terminal apparatuses 200 are selected will be described as an example. Although a configuration of the base station apparatus 100 in the present embodiment is the same as that of FIG. 2, an operation in the selection unit 307 differs from that of the first embodiment.

Hereinafter, a part where an operation differs from that of the first embodiment will be described, and with respect to a part where the same operations are performed, description will be omitted. The selection unit 307, based on channel information of each terminal apparatus 200 acquired in the channel information acquisition unit 305, selects a plurality of terminal apparatuses 200 to be multiplexed by the multiuser MIMO. Besides, in the present embodiment, description will be carried out assuming that four terminals that are the first to fourth terminal apparatuses 200-1 to 200-4 have been selected.

Next, the selection unit 307, from the CSI reported from four selected terminal apparatuses 200, calculates a spatial correlation value of a channel between the base station apparatus 100 and each terminal apparatus 200, and compares an average value $r_{ave}$ or a maximum value $r_{max}$ of the calculated spatial correlation value with a predetermined threshold value $r_{th}$, and outputs a precoding method selection signal where the linear precoding is selected as the precoding method of the multiuser MIMO when the average value $r_{ave}$ or the maximum value $r_{max}$ is smaller than the threshold value $r_{th}$, and the nonlinear precoding that a transmission performance deterioration associated with increase of the spatial correlation is small is selected when the average value $r_{ave}$ or the maximum value $r_{max}$ is larger than the threshold value $r_{th}$. In addition, in the selection unit 307, based on the channel information of each selected terminal apparatus 200, modulation parameters such as an MCS of transmission data addressed to each terminal apparatus 200 may be selected. The above-mentioned spatial correlation value in each terminal apparatus 200, when a channel matrix H is used as CSI, it is preferred to use an average value or maximum value of non-diagonal components of a transmission correlation matrix $R_{TX}$ calculated from Formula (2) for example, on the basis of a plurality of pieces of CSI reported from terminal apparatuses 200 over multiple times in terms of time, and however, it is not limited to this. Where, in Formula (2), E(X) represents a time average (expected value) of X. A configuration of the terminal apparatus 200 in the present embodiment is the same as that of FIG. 6A or 6B. Besides, in the present specification, a concept of a spatial correlation value of a channel including an average value, a minimum value (lowest value), and a maximum value (highest value) is made to be defined as "value derived from each spatial correlation value".

[Formula 2]

$$R_{TX}=E(H^H H) \quad (2)$$

Figure 10:
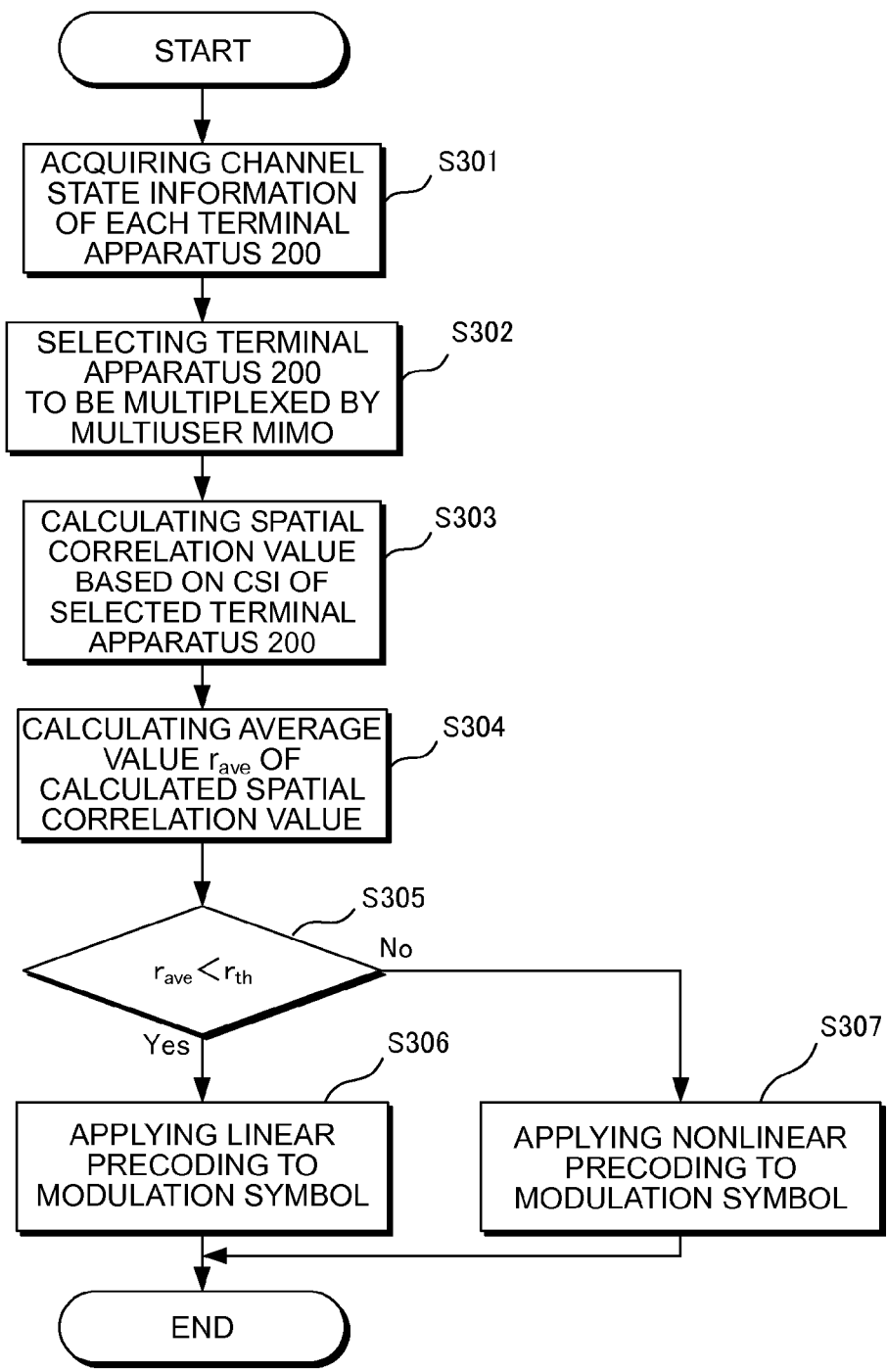
FIG. 10 is a flow chart illustrating an example of a selection process operation of a precoding method in the selection unit 307 and precoding unit 315 according to a third embodiment of the present invention.

FIG. 10 is a flow chart illustrating an example of selection process operations of a precoding method in the selection unit 307 and precoding unit 315 according to the third embodiment of the present invention.

In the selection unit 307, the channel information acquired in the channel information acquisition unit 305 is inputted (Step S301), and a plurality of terminal apparatuses 200 to be multiplexed by the multiuser MIMO are selected based on the inputted channel information (Step S302), and CSI is acquired from channel information of a plurality of selected terminal apparatuses 200, and based on the CSI, a spatial correlation value in each terminal apparatus 200 is calculated (Step S303), and an average value $r_{ave}$ of the calculated spatial correlation value in each terminal apparatus 200 is calculated (Step S304), and an average value $r_{ave}$ of the calculated spatial correlation value is compared with a predetermined threshold value $r_{th}$ (Step S305), and in the precoding unit 315, if an average value $r_{ave}$ is smaller than the threshold value $r_{th}$ (Yes at Step S305), a result where a linear precoding has been applied to each inputted modulation symbol is made to be outputted (Step S306), and if an average value $r_{ave}$ is no less than the threshold value $r_{th}$ (No at Step S305), a result where a nonlinear precoding has been applied to each inputted modulation symbol is made to be outputted (Step S307).

As described above, according to the present embodiment, with respect to each terminal apparatus 200 spatially multiplexed by the multiuser MIMO, when a spatial correlation value of a channel between the base station apparatus and the terminal apparatus 200 is low, use of the linear precoding is made to be selected, and when a spatial correlation value is high, a nonlinear precoding where a transmission performance deterioration associated with increase of the spatial correlation is small is made to be selected, and thereby, the multiuser MIMO transmission based on an appropriate precoding method in consideration of an influence of the spatial correlation will become possible.

Fourth Embodiment

Next, a communication technology according to a fourth embodiment of the present invention will be described. In the present embodiment, in FIG. 1, described will be as an example a communication system where communication is carried out by selecting a case where the base station apparatus 100 communicates with a plurality of terminal apparatuses 200 (first to seventh terminal apparatuses 200-1 to 200-7), and selects, from among these terminal apparatuses 200, one terminal apparatus 200 (for example, the first terminal apparatus 200-1), and multiplexes by a single user MIMO and transmits a plurality of transmission data, and a case where the base station apparatus 100 selects a plurality of terminal apparatuses 200 (for example, four terminal apparatuses 200 that are the first to fourth terminal apparatuses 200-1 to 200-

4), and multiplexes by the multiuser MIMO and transmits a plurality of transmission data addressed to each terminal apparatus 200.

Each of terminal apparatuses 200-1 to 200-7 receives a pilot signal (reference signal) from the base station apparatus 100, and estimates a channel state between each transmission antenna of the base station apparatus 100 and each reception antenna of the terminal apparatus 200 of its own, and reports channel information representing the channel state each to the base station apparatus 100.

The base station apparatus 100, based on the channel information reported from each terminal apparatus 200 and others, selects one terminal apparatus 200 (terminal apparatus 200-1) or a plurality of terminal apparatuses 200 (in FIG. 1, four terminal apparatuses 200-1 to 200-4), and performs the single user MIMO transmission to one terminal apparatus 200, where a plurality of transmission data are multiplexed spatially, or performs the multiuser MIMO transmission which carries out concurrent communication, where transmission data addressed to a plurality of terminal apparatuses 200 are multiplexed spatially.

For example, as channel information, the base station apparatus 100 receives, from each terminal apparatus 200, reception quality information CQI which represents an SNR, an SINR, a CNR, a CINR or a value calculated from them, and a channel status information CSI which represents a complex channel gain and a covariance value thereof or the like from each transmission antenna of the base station apparatus 100 to each reception antenna of each terminal apparatus 200, and selects, on the basis of these pieces of information, one terminal apparatus 200 to which transmission is carried out by the single user MIMO, or a plurality of terminal apparatuses 200 to which transmission is carried out by the multiuser MIMO. In the present embodiment, description will be carried out, where a communication system in which an SINR is reported as CQI is made to be an example, and a case where four terminal apparatuses 200 are selected when the multiuser MIMO transmission is performed is made to be an example. Although a configuration of the base station apparatus 100 in the present embodiment is the same as that of FIG. 2, operations of the encoding unit 311, the transmission buffer unit 309, the selection unit 307, and the control information generation unit 325 differ from those in the first embodiment. Hereinafter, a part where operations differ from those of the first embodiment will be described, and with respect to a part where the same operations are performed, description will be omitted.

The selection unit 307 selects, based on the channel information of each terminal apparatus 200 acquired by the channel information acquisition unit 305, one terminal apparatus 200 to which transmission is carried out where a plurality of transmission data are multiplexed by the single user MIMO, or a plurality of terminal apparatuses 200 which are multiplexed by the multiuser MIMO. Besides, in the present embodiment, description will be carried out assuming that a first terminal apparatus 200-1 is selected as a case of a single user MIMO transmission, and four terminals of first to fourth terminal apparatuses 200-1 to 200-4 are selected as a case of a multiuser MIMO transmission. The selection unit 307 outputs a precoding method selection signal where when multiplexing a plurality of transmission data by the single user MIMO is selected, a linear precoding is made to be selected as a precoding method, and when multiplexing the transmission data addressed to a plurality of terminal apparatuses 200 by the multiuser MIMO is selected, a nonlinear precoding is made to be selected as a precoding method. In addition, based on channel information of each selected terminal apparatus 200, modulation parameters such as an MCS of each of transmission data may be selected.

The transmission buffer unit 309 accumulates transmission data series inputted, from a higher layer, addressed to each terminal apparatus 200, and outputs to the encoding unit 311 a plurality of transmission data series addressed to a first terminal apparatus 200-1 selected by the selection unit 307, or each transmission data series addressed to first to fourth terminal apparatuses 200-1 to 200-4. The encoding unit 311 performs error correction encoding each with respect to a plurality of transmission data series addressed to a first terminal apparatus 200-1 or each transmission data series addressed to first to fourth terminal apparatuses 200-1 to 200-4, which are inputted from the transmission buffer unit 309. Besides, when a coding rate of each transmission data is selected in the selection unit 307, rate matching (puncture) is made to be performed in accordance with the coding rate. When a coding rate is not specified, rate matching may be performed with a predetermined coding rate.

The control information generation unit 325, based on the selection result of the selection unit 307, generates information on a MIMO system representing whether the MIMO system is a single user MIMO or a multiuser MIMO, and control information including information on each transmission data or an MCS with respect to each of terminal apparatuses 200 or the like, and transmits the information to each terminal apparatus 200 via the radio transmission unit 323 and the antenna unit 303. Besides, when multiplexing a plurality of transmission data by the single user MIMO is selected in the selection unit 307, four series of modulation symbols addressed to a first terminal apparatus 200-1 are inputted to the precoding unit 315.

Although a configuration of the terminal apparatus 200 in the present embodiment is the same as that of FIG. 6A or 6B, operations of the control information acquisition unit 705 and the determination unit 717 differ from those in the first embodiment. Hereinafter, with respect to a case of FIG. 6A, a part where operations differ from those of the first embodiment will be described, and with respect to a part where the same operations are performed and a case of FIG. 6B, description will be omitted. The control information acquisition unit 705 extracts and acquires, from a reception signal, information representing whether the MIMO system is the single user MIMO or the multiuser MIMO, and control information including information on each transmission data or an MCS with respect to each of terminal apparatuses 200, where these of information are from the base station apparatus 100. The determination unit 717, when information representing whether the MIMO system is the single user MIMO or the multiuser MIMO included in the control information acquired by the control information acquisition unit 705 is first information representing the single user MIMO, instructs the Modulo operation unit 719 so as not to perform a Modulo operation assuming that a linear precoding has been used, and when the information is second information representing the multiuser MIMO, instructs the Modulo operation unit 719 so as to perform a Modulo operation assuming that a nonlinear precoding has been used.

Figure 11:
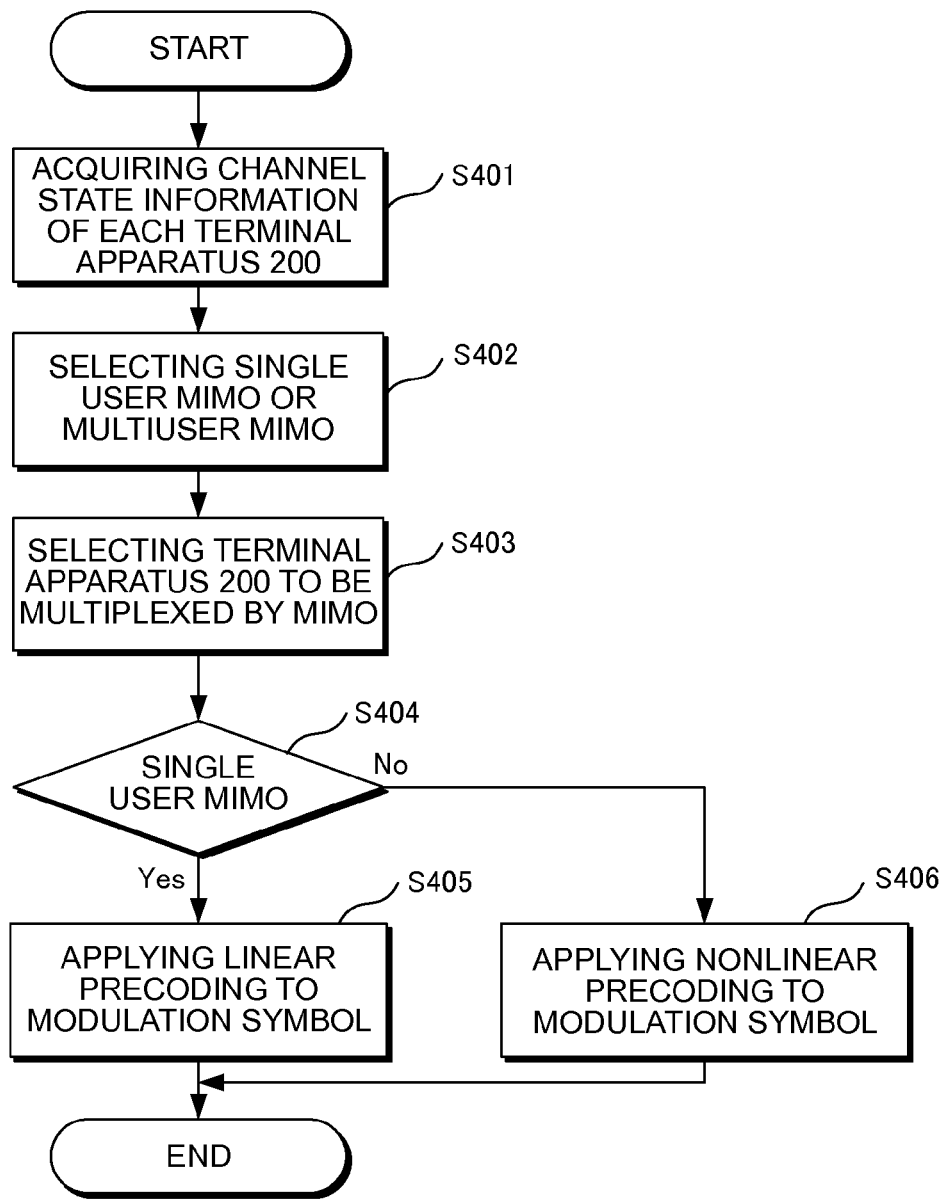
FIG. 11 is a flow chart illustrating an example of a selection process operation of a precoding method in the selection unit 307 and precoding unit 315 according to a fourth embodiment of the present invention.

FIG. 11 is a flow chart illustrating an example of selection process operations of a precoding method in the selection unit 307 and precoding unit 315 according to the fourth embodiment of the present invention. In the selection unit 307, the channel information acquired in the channel information acquisition unit 305 is inputted (Step S401), and based on the inputted channel information, it is made to be selected whether to perform the single user MIMO, or to perform the multiuser MIMO (Step S402), and one terminal apparatus 200 is made to be selected when the selected MIMO system is the single user MIMO, and a plurality of terminal apparatuses 200 to be multiplexed are made to be selected when the selected MIMO system is the multiuser MIMO (Step S403), and in the precoding unit, when the selected MIMO system is the single user MIMO (Yes at Step S404), a result where the linear precoding has been applied to each inputted modulation symbol is made to be outputted (Step S405), and when the selected MIMO system is the multiuser MIMO (No at Step S404), a result where the nonlinear precoding has been applied to each inputted modulation symbol is made to be outputted (Step S406).

As described above, according to the present embodiment, when the single user MIMO transmission is performed to one terminal apparatus 200 where a plurality of transmission data are multiplexed spatially, use of the linear precoding is made to be selected, and when the multiuser MIMO transmission is performed where transmission data addressed to a plurality of terminal apparatuses 200 are multiplexed spatially and concurrent communication is carried out, use of the nonlinear precoding is made to be selected, and thereby, it becomes possible to select the precoding method in accordance with a system of MIMO transmission and carry out the MIMO transmission.

A program which operates in a communication apparatus according to the present invention may be a program (program to make a computer function) which controls a CPU (Central Processing Unit) or the like so as to realize functions of the above-mentioned embodiments according to the present invention. Then, information handled with these devices are temporarily accumulated in a RAM (Random Access Memory) at the time of the processing, and after that, are stored in various ROMs and HDDs (Hard Disk Drive), such as a Flash ROM (Read Only Memory), and are read out by the CPU as necessary, and correcting and writing are performed. In addition, a program for realizing functions of each configuration of FIG. 6A and FIG. 6B or the like is made to be recorded on a computer readable recording medium, and the program recorded on this recording medium is made to be read into a computer system, and is made to be executed, and thereby, processing of each part may be performed. Besides, the "computer system" referred to herein is assumed to include an OS and/or hardware such as peripheral devices.

In addition, the "computer readable recording medium" refers to a movable medium such as a flexible disk, a magneto-optical disk, a ROM, a CD-ROM, and a storage device such as a hard disk incorporated in the computer system. Furthermore, the "computer readable recording medium" is also assumed to include one which holds a program dynamically in a short time like a network such as the Internet and/or a communication line in the case of transmitting a program via a communication channel such as a telephone line, and another which holds a program in a certain period of time like a volatile memory within a computer system which will become, in that case, a server and/or a client. In addition, above-mentioned programs may be ones for realizing a part of functions mentioned above, and furthermore, may be other ones which are able to realize functions mentioned above in combination with programs already recorded on a computer system. In addition, a part or all of communication apparatuses in the embodiments mentioned above (base station apparatus 100 and terminal apparatus 200) may be realized as an LSI which is an integrated circuit typically. Each functional block of the communication apparatuses may be made to be a chip individually, and a part or all thereof may be made to be integrated to make a chip. In addition, a technique to make an integrated circuit may be realized not only by an LSI but by a dedicated circuit, or by a general-purpose processor. In addition, in a case where a technology of making an integrated circuit which substitutes for an LSI appears owing to a progress of semiconductor technologies, it is also possible to use an integrated circuit on the basis of the technologies.

As described above, embodiments of the invention have been described referring to the drawings, and however, concrete configurations are not limited to these embodiments, and design modifications or the like within a scope not departing from substance of this invention are included in the invention.

DESCRIPTION OF SYMBOLS

100 Base station apparatus (wireless transmission apparatus)
200, 200-1 to 200-7 Terminal apparatus (wireless reception apparatus)
301 Radio reception unit
303 Antenna unit
305 Channel information acquisition unit
307 Selection unit
309 Transmission buffer unit
311 Encoding unit
313 Modulation unit
315 Precoding unit
317 Pilot multiplexing unit
319 IFFT unit
321 GI insertion unit
323 Radio transmission unit
325 Control information generation unit
327 Control unit
401 Linear precoding unit
403 Nonlinear precoding unit
405 Switching unit
501 Filter calculation unit
503 Linear filter unit
601 QR decomposition unit
603 Interference component calculation unit
605 Linear filter unit
607, 607a, 607b, 607c, and 607d Modulo operation unit
609, 609b, 609c, and 609d Interference component subtraction unit
701 Radio reception unit
703 Antenna unit
705 Control information acquisition unit
707 GI removing unit
709 FFT unit
711 Pilot separation unit
713 Channel compensation unit
715 Channel estimation unit
717 Determination unit
719 Modulo operation unit
721 Demodulation unit
723 Decoding unit
725 Channel information generation unit
727 Radio transmission unit
729 Control unit

The invention claimed is:

1. A wireless transmission apparatus which includes a plurality of transmission antennas, and with respect to a plurality of wireless reception apparatuses, multiplexes spatially and transmits a plurality of series of data, comprising:
a selector configured and/or programmed to select either of a first precoding method carrying out linear processing with respect to said plurality of series of data or a second precoding method carrying out nonlinear processing with respect to said plurality of series of data based on channel information acquired from said plurality of wireless reception apparatuses or information derived from said channel information; and a precoder configured and/or programmed to carry out precoding with respect to said plurality of series of data using said selected precoding method; wherein said selector configured and/or programmed to select said first precoding method in a case where a spatial correlation value of each channel between said wireless transmission apparatus and said plurality of wireless reception apparatuses is smaller than a predetermined threshold value, and to select said second precoding method in a case where said spatial correlation value is larger than said threshold value.

2. The wireless transmission apparatus according to claim 1, wherein said selector is configured and/or programmed to calculate, based on said channel information, said spatial correlation value, and to compare said each spatial correlation value or a value derived from said each spatial correlation value with a predetermined threshold value, and as a result of said comparison, when said each spatial correlation value or said value derived from said each spatial correlation value is smaller than said threshold value, to select said first precoding method, and on the other hand, when said each spatial correlation value or said a value derived from said each spatial correlation value is larger than said threshold value, to selects said second precoding method.

3. An integrated circuit which makes a wireless transmission apparatus exert a plurality of functions by being implemented in said wireless transmission apparatus provided with a plurality of transmission antennas, the functions comprising:

a function which multiplexes spatially and transmits a plurality of series of data to a plurality of wireless reception apparatuses;

a function which acquires channel state information from said plurality of wireless reception apparatuses;

a function which selects either of a first precoding method carrying out linear processing with respect to said plurality of series of data or a second precoding method carrying out nonlinear processing with respect to said plurality of series of data, based on said channel state information or information derived from said channel state information; and a function which carries out precoding with respect to said plurality of series of data using said selected precoding method; wherein said first precoding method is selected in a case where a spatial correlation value of each channel between said wireless transmission apparatus and said plurality of wireless reception apparatuses is smaller than a predetermined threshold value, and said second precoding method is selected in a case where said spatial correlation value is larger than said threshold value.

4. The integrated circuit according to claim 3, the functions further comprising:

a function which calculates said each spatial correlation value based on said channel state information;

a function which compares said each spatial correlation value or a value derived from said each spatial correlation value with a predetermined threshold value;

a function which selects said first precoding method when said each spatial correlation value or said value derived from said each spatial correlation value is smaller than said threshold value, on the other hand, selects a second precoding method when said each spatial correlation value or said value derived from said each spatial correlation value is larger than said threshold value.

* * * * *